US008738674B2

(12) United States Patent
Kobayashi

(10) Patent No.: US 8,738,674 B2
(45) Date of Patent: May 27, 2014

(54) INFORMATION PROCESSING APPARATUS, INFORMATION PROCESSING METHOD AND PROGRAM

(75) Inventor: Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1450 days.

(21) Appl. No.: 11/584,626

(22) Filed: Oct. 23, 2006

(65) Prior Publication Data

US 2007/0112558 A1 May 17, 2007

(30) Foreign Application Priority Data

Oct. 25, 2005 (JP) ................................ 2005-310408

(51) Int. Cl.
*G06F 7/00* (2006.01)
*G06F 15/00* (2006.01)
*G06F 9/44* (2006.01)

(52) U.S. Cl.
USPC .......................................... 708/200; 717/151

(58) Field of Classification Search
USPC .................. 708/200–209, 422; 717/151–161
See application file for complete search history.

(56) References Cited

U.S. PATENT DOCUMENTS

| | | | | |
|---|---|---|---|---|
| 5,343,554 | A * | 8/1994 | Koza et al. | 706/13 |
| 5,742,738 | A * | 4/1998 | Koza et al. | 706/13 |
| 5,822,759 | A * | 10/1998 | Treynor | 711/134 |
| 6,011,919 | A * | 1/2000 | Politis et al. | 717/114 |
| 6,236,410 | B1 * | 5/2001 | Politis et al. | 345/440 |
| 6,460,061 | B1 * | 10/2002 | Dick | 708/401 |
| 7,086,038 | B2 * | 8/2006 | Cronquist et al. | 717/136 |
| 7,337,437 | B2 * | 2/2008 | Bera | 717/141 |
| 7,472,359 | B2 * | 12/2008 | Ciesielski et al. | 716/130 |
| 7,543,015 | B2 * | 6/2009 | Vion-Dury et al. | 709/200 |
| 7,738,982 | B2 * | 6/2010 | Kobayashi et al. | 700/94 |
| 7,752,538 | B2 * | 7/2010 | Vion-Dury | 715/228 |
| 7,756,874 | B2 * | 7/2010 | Hoekman et al. | 707/737 |
| 2001/0049818 | A1 * | 12/2001 | Banerjia et al. | 717/9 |
| 2003/0018608 | A1 * | 1/2003 | Rice et al. | 707/1 |
| 2004/0181401 | A1 | 9/2004 | Pachet et al. | |
| 2005/0154580 | A1 * | 7/2005 | Horowitz et al. | 704/9 |
| 2005/0217463 | A1 * | 10/2005 | Kobayashi | 84/612 |
| 2006/0031233 | A1 * | 2/2006 | Liu et al. | 707/100 |
| 2006/0098018 | A1 * | 5/2006 | Tarditi et al. | 345/505 |
| 2006/0235920 | A1 * | 10/2006 | Yu | 708/446 |

FOREIGN PATENT DOCUMENTS

| | | |
|---|---|---|
| JP | 2000-207444 | 7/2000 |
| JP | 2001-159983 | 12/2001 |

OTHER PUBLICATIONS

S. S. Muchnick, "Advanced Compiler Design and Implementation," Morgan Kaufmann, 1997, pp. 377-380.*

S. Gupta, M. Reshadi, N. Savoiu, N. Dutt, R. Gupta, and A. Nicolau, "Dynamic Common Sub-expression Elimination during Scheduling in High-level Synthesis," ISSS'02: Proceedings of the 15th International Symposium on System Synthesis, ACM Press, 2002, pp. 261-266.*

(Continued)

*Primary Examiner* — Chuong D Ngo
*Assistant Examiner* — Matthew Sandifer
(74) *Attorney, Agent, or Firm* — Finnegan, Henderson, Farabow, Garrett & Dunner, L.L.P.

(57) ABSTRACT

An information processing apparatus to create an arithmetic expression by combining one or more operators includes a detection unit to detect a permutation of plural operators existing in common to the plural created arithmetic expressions, and a registration unit to register the detected permutation of the operators as a new operator.

9 Claims, 34 Drawing Sheets

(56) References Cited

OTHER PUBLICATIONS

R. Pasko, P. Schaumont, V. Derudder, and D. Durackova, "Optimization method for broadband modem FIR filter design using common subexpression elimination", Proc. 10th Int. Symp. Syst. Synthesis, pp. 100-106, 1997.*

* cited by examiner

| INPUT DATA | EXPLANATION | HOLDING DIMENSION |
|---|---|---|
| Wav | PCM WAVEFORM DATA | TIME, Ch |
| 12tones | PCM WAVEFORM DATA IS ANALYZED IN TIME-TONE | TIME, TONE |
| Chord | CHORD PROGRESSION OF MUSIC PIECE | TIME, TONE |
| Key | KEY OF MUSIC PIECE | TIME, TONE |

Wav: PCM WAVEFORM DATA OF MUSIC PIECE

FIG. 14

Chord: CHORD SIGNAL DATA OF MUSIC PIECE

24 KINDS

| | | | | | | | | |
|---|---|---|---|---|---|---|---|---|
| Bm | 0 | 0 | 0 | 0 | 18 | 6 | 0 | 0 |
| • • • | | | | | | | | |
| D | 0 | 0 | 5 | 1 | 22 | 11 | 0 | 0 |
| C# | 0 | 0 | 0 | 0 | 0 | 0 | 0 | 0 |
| C | 100 | 97 | 26 | 13 | 23 | 12 | 85 | 96 |

TIME (BEAT)

※ VALUE IS PROBABILITY THAT THE CHORD APPEARS AT THE TIME

FIG. 15

Key: KEY (TONE) DATA OF MUSIC PIECE

12 KINDS

| | | | | | | | | |
|---|---|---|---|---|---|---|---|---|
| B | 0 | 0 | 0 | 0 | 0 | 0 | 0 | 0 |
| • • • | | | | | | | | |
| D | 0 | 0 | 0 | 0 | 2 | 1 | 0 | 0 |
| C# | 0 | 0 | 0 | 0 | 0 | 0 | 0 | 0 |
| C | 97 | 98 | 99 | 96 | 95 | 97 | 96 | 95 |

TIME (BEAT)

※ VALUE IS PROBABILITY THAT THE CHORD APPEARS AT THE TIME

FIG. 21A

FIG. 21B

EXAMPLE: Mean VALUES OF SPECIFIED AXIS ARE AVERAGED

| TONE/TIME | 1 | 2 | 3 | 4 | 5 | 6 | 7 | 8 |
|---|---|---|---|---|---|---|---|---|
| B7 | 2 | 3 | 4 | 3 | 3 | 3 | 4 | 4 |
| • • • | | | | | | | | |
| D1 | 1 | 2 | 3 | 2 | 3 | 4 | 3 | 2 |
| C#1 | 0 | 0 | 0 | 0 | 1 | 2 | 1 | 0 |
| C1 | 2 | 0 | 0 | 0 | 2 | 0 | 0 | 0 |

AVERAGE IN TIME AXIS

| TONE | |
|---|---|
| B7 | 3.25 |
| • • • | |
| D1 | 2.5 |
| C#1 | 0.5 |
| C1 | 0.5 |

Regression (LINEAR)
$X_n$: LOW-LEVEL FEATURE QUANTITY
$b_n$: PARAMETER

Regression (NON-LINEAR)
$X_n$: LOW-LEVEL FEATURE QUANTITY
$b_{nm}$: PARAMETER
K(x,y): KERNEL FUNCTION

FIG. 27

Classify (EUCLID DISTANCE)
EUCLID DISTANCE FROM CENTER OF EACH CLASS IS CALCULATED, AND CLASSIFICATION IS MADE INTO CLOSEST CLASS

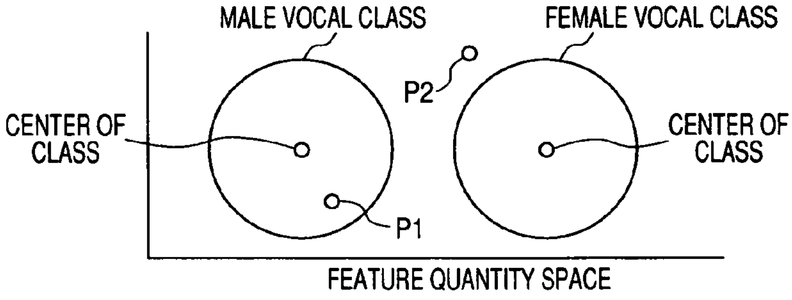

EUCLID DISTANCE:
X: LOW-LEVEL FEATURE QUANTITY
T: AVERAGE OF LOW-LEVEL FEATURE QUANTITY OF TEACHER DATA BELONGING TO CLASS
$d = \sqrt{(X-T)^T (X-T)}$

FIG. 28

Classify (VECTOR CORRELATION)
CORRELATION TO MEAN VECTOR OF EACH CLASS IS CALCULATED, AND CLASSIFICATION IS MADE INTO CLASS HAVING HIGHEST CORRELATION

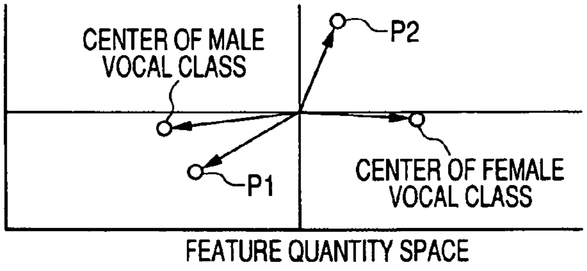

CORRELATION COEFFICIENT:
X: LOW-LEVEL FEATURE QUANTITY
T: AVERAGE OF LOW-LEVEL FEATURE QUANTITY OF TEACHER DATA BELONGING TO THIS CLASS
$correl = (X/T^T) / (|X| |T|)$

FIG. 29

Classify (MAHALANOBIS DISTANCE)
MAHALANOBIS DISTANCE FROM EACH CLASS IS CALCULATED, AND CLASSIFICATION IS MADE INTO CLOSEST CLASS

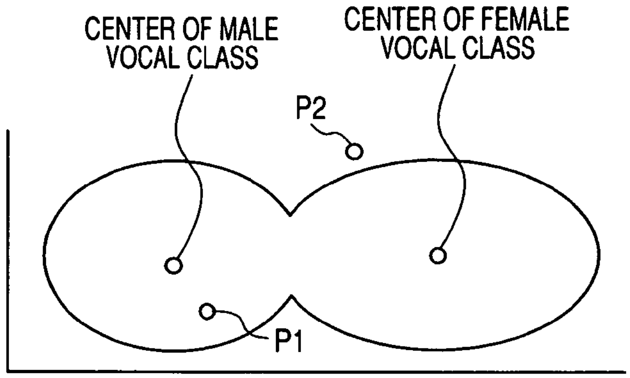

MAHALANOBIS DISTANCE:
X: LOW-LEVEL FEATURE QUANTITY
Σ: VARIANCE COVARIANCE MATRIX OF LOW-LEVEL FEATURE QUANTITY OF TEACHER DATA BELONGING TO THIS CLASS
T: AVERAGE OF LOW-LEVEL FEATURE QUANTITY OF TEACHER DATA BELONGING TO THIS CLASS $$d = \sqrt{(X-T)^T \Sigma^{-1} (X-T)}$$

Classify (VARIOUS Mixture Model)
DISTRIBUTION OF EACH CLASS IS REPRESENTED BY PLURAL CLASSES EUCLID DISTANCE → KNN
(K-nearest neighbor)

MAHALANOBIS DISTANCE → GMM
(Gaussian Mixture Model)

FIG. 31

SVM (SUPPORT VECTOR MACHINE)
SEPARATION PLANE BETWEEN CLASSES IS REPRESENTED BY SUPPORT VECTOR
Xn: LOW-LEVEL FEATURE QUANTITY bnm: PARAMETER
K(x,y): KERNEL FUNCTION Y = b1K(b1,X)+b3Y(b3,X)+ ⋯ b0

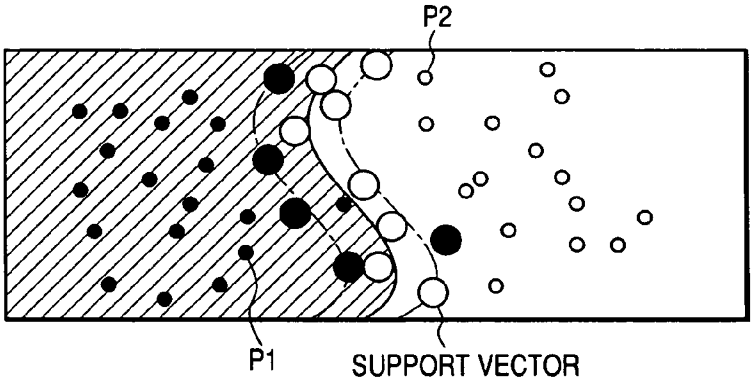

bnm IS ESTIMATED SO THAT DISTANCE (MARGIN) BETWEEN SEPARATION PLANE AND VECTOR NEAR THE BOUNDARY BECOMES MAXIMUM

FIG. 32

GP (Genetic Programming)
EXPRESSION IN WHICH LOW-LEVEL FEATURE QUANTITIES ARE COMBINED IS CREATED BY GP EXAMPLE OF EXPRESSION TO BE CREATED:
$Y = ((X_2+0.4)>X_5) * 0.5+ (X_1-(X_3/X_8))$

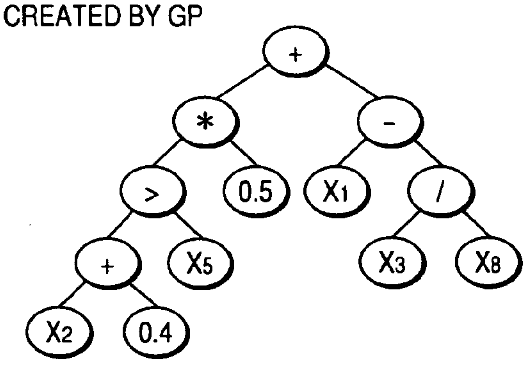

EVALUATION VALUE = CORRELATION BETWEEN TEACHER DATA AND Y

FIG. 35

| |
|---|
| 12Tones, 32#FFT, 16#Mean, 48#StdDev, **32#FFT, Log, 32#FFT**, 32#MaxIndex |
| 12Tones M, 16#UVariance, 32#TimeImpression_Tone;0.055,**32#FFT, Log, 32#FFT**, Log, 32#IndexLRO |
| Chord, **32#FFT, Log, 32#FFT**, 16#MMean, 32#TimeImpression_Attack;0.471, 32#IndexLR |
| Key, 16#UVariance, 32#Differential, Log, 32#HPF_1;0.358, 32#TimeImpression_Attack;0.376, Log, **32#FFT, Log, 32#FFT**,3 |
| Key, 32#Differential, **32#FFT, Log, 32#FFT**, 16#FFT, 32#UVariance, 16#IndexLRO |
| Key, 32#TimeImpression_Tone;0.479, Log. 32#TimeImpression_Attack;0.893, 16#FFT, 16#UVariance, 32#TimeI mpressi |

FIG. 36

| |
|---|
| 12Tones, 48#UVariance, 32#HPF_1;0.125, Log, 32#Differential, <u>NewOperator1</u>, 16#DownSampling;2.371, 32# |
| 12TonesM, 16#Extract1;0.670, <u>NewOperator1</u>.32#IndexLR |
| 12TonesM, 16#HPF_1;0.224, 16#HPF_1;0.407, 32#HPF_1;0.246, 16#FFT, <u>NewOperator1</u>, 32#MStdDev, 16#Tim |
| Chord, 16#FFT, <u>NewOperator1</u>, 32#TimeImpression_Attack;0.038, 16#MaxIndex, 32#TimeImpression_Tone |
| Chord, <u>NewOperator1</u>, Log, 16#HPF_1;0.226, 16#MMean, 32#Mean |

INFORMATION PROCESSING APPARATUS, INFORMATION PROCESSING METHOD AND PROGRAM

CROSS REFERENCE TO RELATED APPLICATIONS

The present invention contains subject matter related to Japanese Patent Application JP 2005-310408 filed in the Japanese Patent Office on Oct. 25, 2005, the entire contents of which being incorporated herein by reference.

BACKGROUND OF THE INVENTION

1. Field of the Invention

The present invention relates to an information processing apparatus, an information processing method and a program, and particularly to an information processing apparatus, an information processing method and a program, which is suitably used for a case where for example, plural operators are combined to create an arithmetic expression.

2. Description of the Related Art

In related art, there is proposed an invention relating to automatic creation of algorithm in which music data is inputted and the feature quantity (quickness of music data, clearness, liveliness, etc.) of the music data is outputted (see, for example, US2004/0181401A1 (patent document 1)).

SUMMARY OF THE INVENTION

In the invention recited in patent document 1, as shown in FIG. 1, the feature quantity extraction algorithm to extract the feature quantity from the music data and its metadata is created, and the amount of arithmetic operation required for the creation process of the algorithm is enormous.

Accordingly, it is desired to realize a method in which algorithm that can extract a corresponding feature quantity from music data is created with least possible waste, with a small amount of arithmetic operation and quickly.

Besides, it is desired to realize a method of detecting a combination of significant operators in a creation process of algorithm.

The invention has been made in view of such circumstances, and enables detection of a permutation of significant operators from an arithmetic expression in which plural operators are combined, and enables quick creation of algorithm.

An information processing apparatus according to an embodiment of the invention is an information processing apparatus to create an arithmetic expression by combining one or more operators and includes detection means for detecting a permutation of plural operators existing in common to the plural created arithmetic expressions, and registration means for registering the detected permutation of the operators as a new operator.

The detection means may detect the permutation of the plural operators including at least one of a processing symmetry axis and a parameter.

The detection means may create plural permutations including a specified number of operators, and may detect one of the created permutations, which has a high appearance frequency in the plural arithmetic expressions.

Creation means for creating the arithmetic expression by combining one or more operators including the operator newly registered by the registration means may be further included.

An information processing method according to an embodiment of the invention is an information processing method of an information processing apparatus to create an arithmetic expression including one or more operators and includes the steps of detecting a permutation of plural operators existing in common to the plural created arithmetic expressions, and registering the detected permutation of the operators as a new operator.

A program according to an embodiment of the invention is a program to create an arithmetic expression including one or more operators and causes a computer to execute a process including the steps of detecting a permutation of plural operators existing in common to the plural created arithmetic expressions, and registering the detected permutation of the operators as a new operator.

According to an embodiment of the invention, a permutation of plural operators existing in common to the plural created arithmetic expressions is detected, and the detected permutation of the operators is registered as a new operator.

According to an embodiment of the invention, a permutation of significant operators can be detected from the arithmetic expression in which plural operators are combined. Thus, since the combination of the significant operators is preferentially searched, the algorithm can be quickly created with less amount of arithmetic operation.

BRIEF DESCRIPTION OF THE DRAWINGS

FIG. 14 is a view for explaining input data Chord.

FIG. 15 is a view for explaining input data Key.

FIG. 21 is a view for explaining an arithmetic operation of an operator Mean.

FIG. 27 is a view for explaining an example of a learning algorithm.

FIG. 28 is a view for explaining an example of a learning algorithm.

FIG. 29 is a view for explaining an example of a learning algorithm.

FIG. 31 is a view for explaining an example of a learning algorithm.

FIG. 32 is a view for explaining an example of a learning algorithm.

FIG. 35 is a view showing an example of a combination of operators.

FIG. 36 is a view showing an example of a combination of operators.

DETAILED DESCRIPTION OF THE INVENTION

Hereinafter, although embodiments of the invention will be described, a correspondence relation between the structural requirements of the invention and embodiments described in the specification or the drawings is exemplified as follows. This description is for confirming that the embodiments to support the invention are disclosed in the specification or the drawings. Accordingly, even if there is an embodiment which is disclosed in the specification or the drawings but is not disclosed here as an embodiment corresponding to the structural requirements of the invention, that does not mean that the embodiment does not correspond to the structural requirements. On the other hand, even if an embodiment is disclosed here to be one corresponding to the structural requirements, that does not mean that the embodiment does not correspond to a structural requirement other than the structural requirements.

Figure 5:
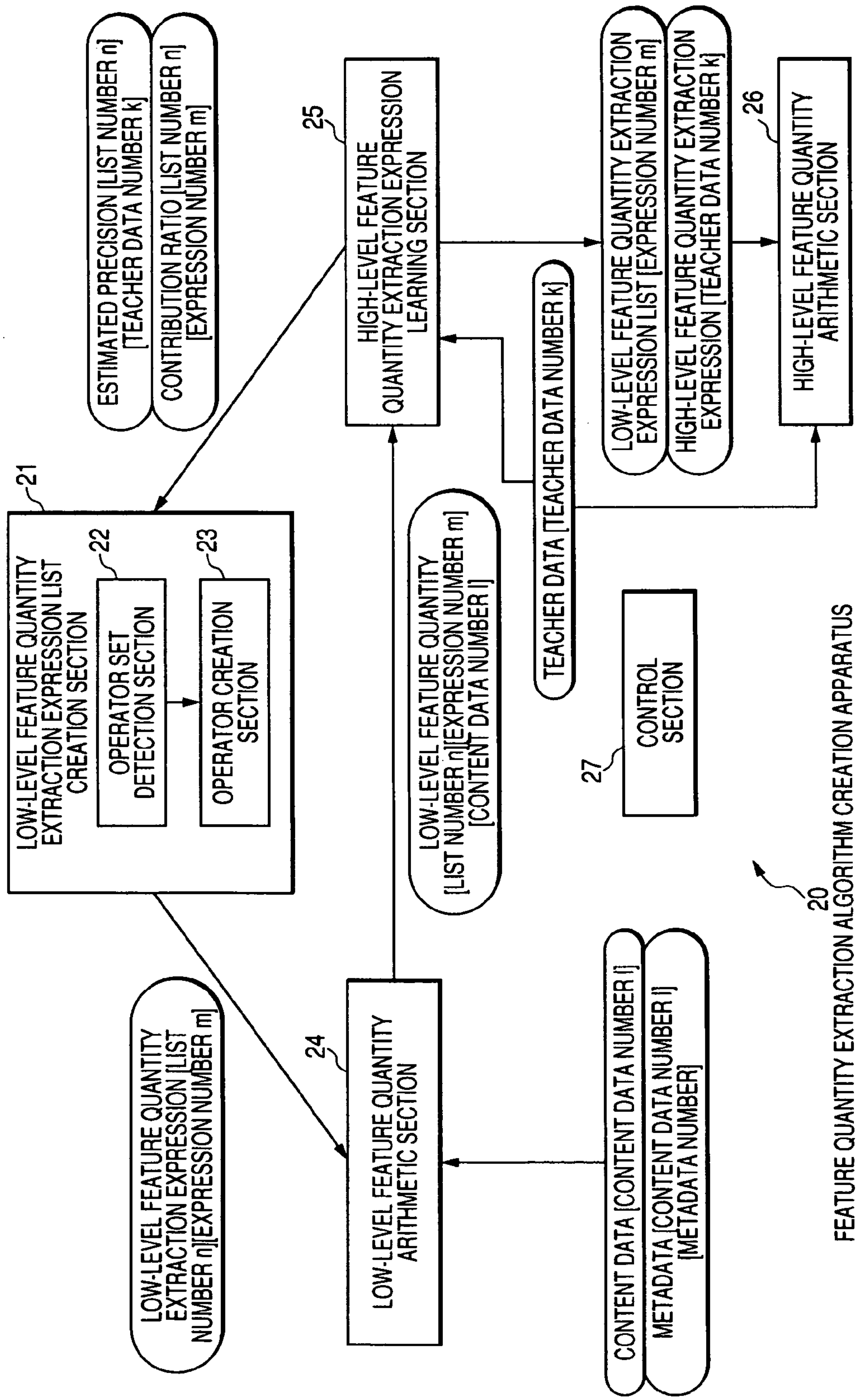
FIG. 5 is a block diagram showing a structural example of a feature quantity extraction algorithm creation apparatus to which the invention is applied.

An information processing apparatus (for example, a low-level feature quantity extraction expression list creation section 21 of FIG. 5) according to an embodiment of the invention is an information processing apparatus to create an arithmetic expression by combining one or more operators and includes detection means (for example, an operator set detection section 22 of FIG. 5) for detecting a permutation of plural operators existing in common to the plural created arithmetic expressions, and registration means (for example, an operator creation section 23 of FIG. 5) for registering the detected permutation of the operators as a new operator.

Figure 37:
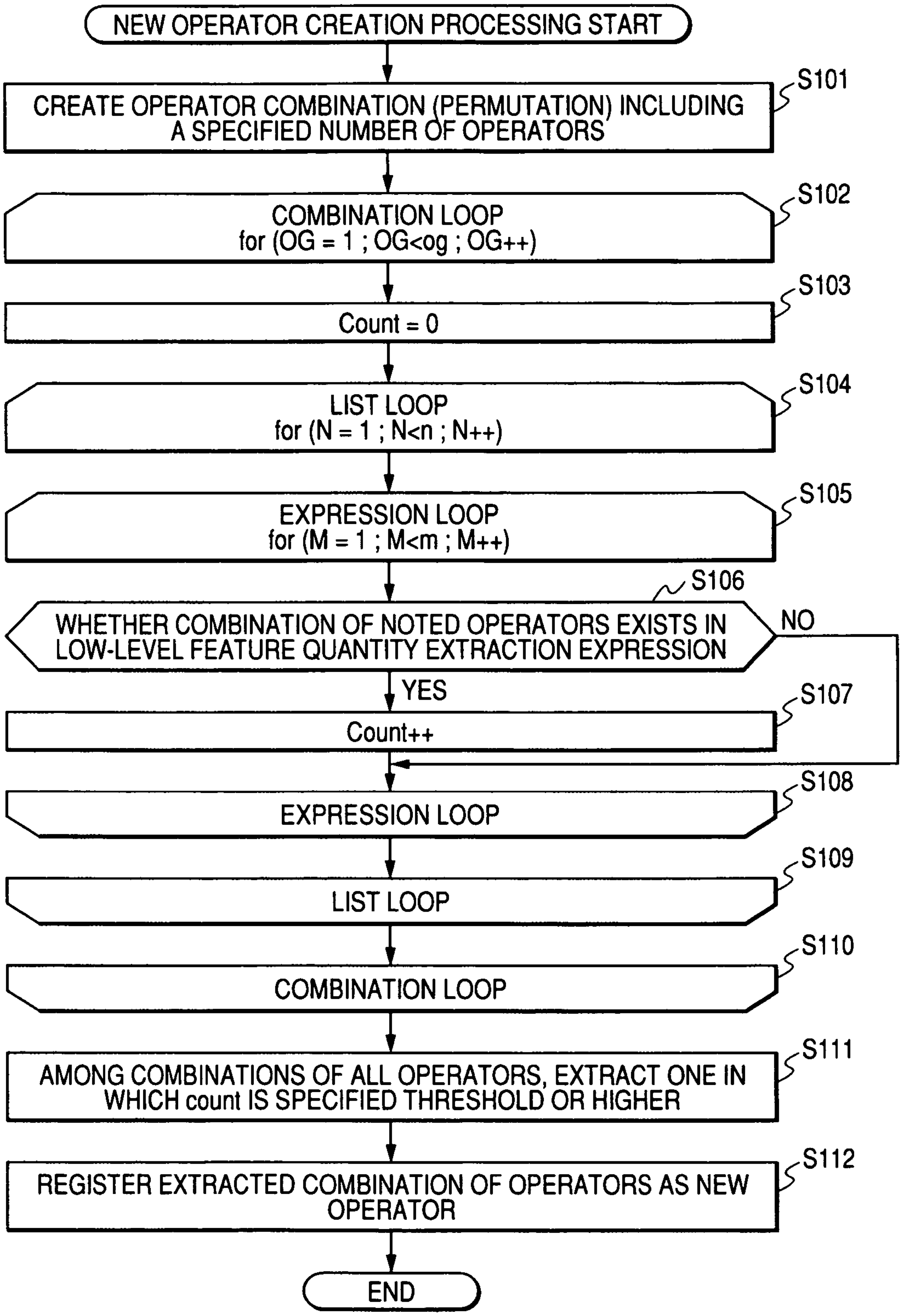
FIG. 37 is a flowchart for explaining a new operator creation processing.

An information processing method according to an embodiment of the invention is an information processing method of an information processing apparatus to create an arithmetic expression including one or more operators and includes the steps of detecting a permutation of plural operators existing in common to the plural created arithmetic expressions (for example, step S106 of FIG. 37), and registering the detected permutation of the operators as a new operator (for example, step S112 of FIG. 37).

A program according to an embodiment of the invention is a program to create an arithmetic expression including one or more operators and causes a computer to execute a process including the steps of detecting a permutation of plural operators existing in common to the plural created arithmetic expressions (for example, step S106 of FIG. 37), and registering the detected permutation of the operators as a new operator (for example, step S112 of FIG. 37).

Hereinafter, specific embodiments in which the invention is applied will be described in detail with reference to the drawings.

Figure 1:
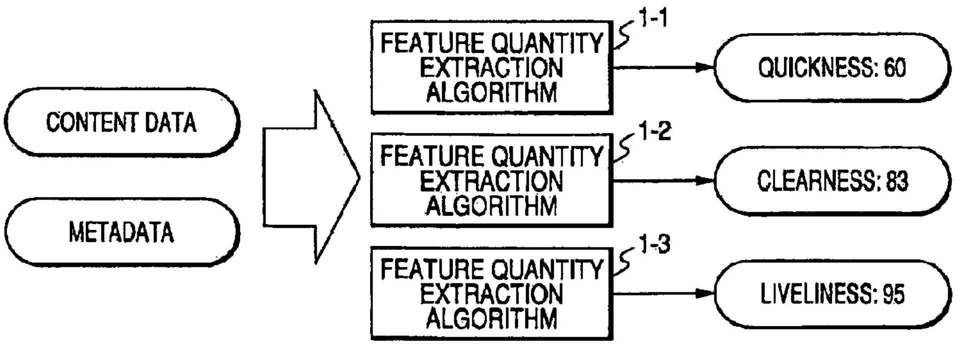
FIG. 1 PRIOR ART
FIG. 1 is a view for explaining a feature quantity extraction algorithm of related art.
Figure 2:
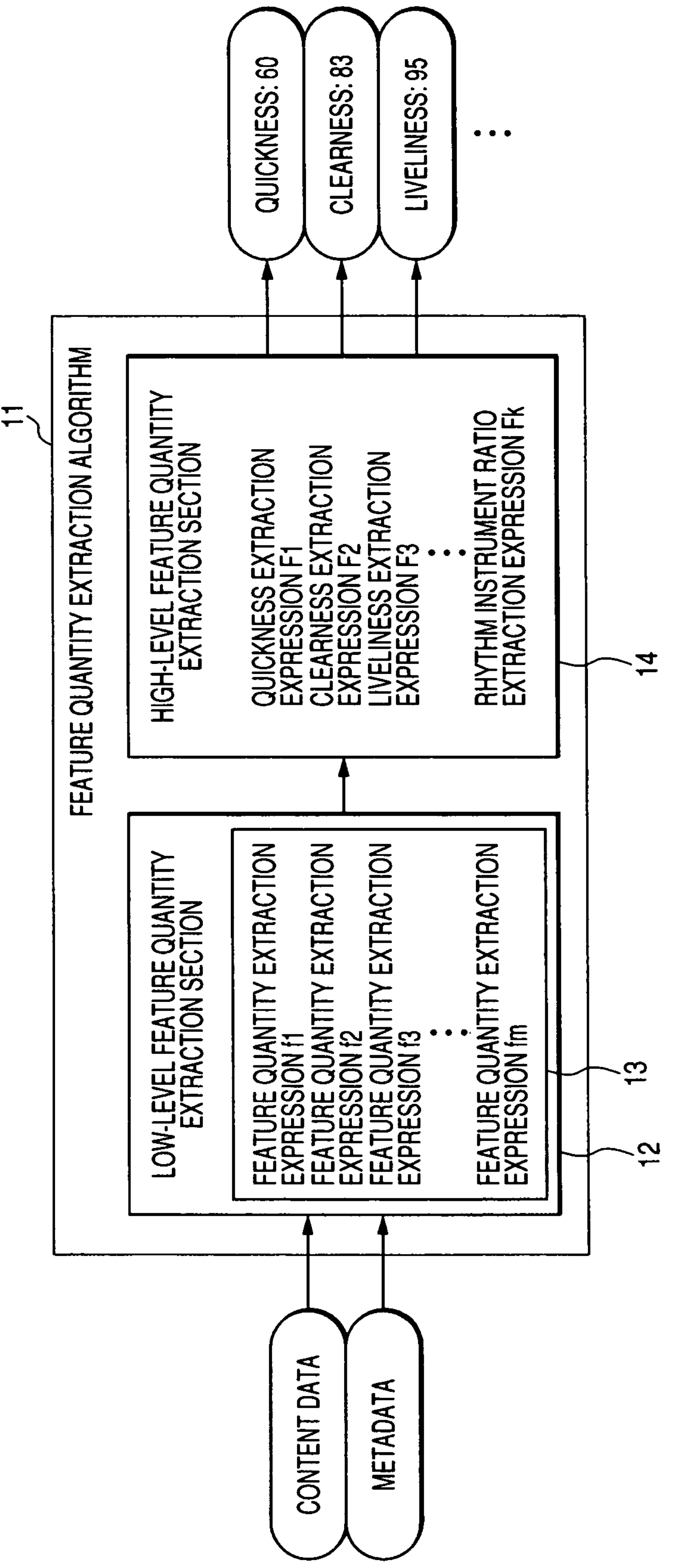
FIG. 2 is a view showing an outline of a feature quantity extraction algorithm created by a feature quantity extraction algorithm creation apparatus to which the invention is applied.

FIG. 2 shows an outline of a feature quantity extraction algorithm created by a feature quantity extraction algorithm creation apparatus 20 (FIG. 5) of an embodiment of the invention. This feature quantity extraction algorithm 11 includes a low-level feature quantity extraction section 12 in which content data (music piece data) and metadata (attribute data) corresponding thereto are inputted and a low-level feature quantity is outputted, and a high-level feature quantity extraction section 14 in which the low-level feature quantity is inputted and a high-level feature quantity is outputted.

The low-level feature quantity extraction section 12 has a low-level feature quantity extraction expression list 13 including m kinds of low-level feature quantity extraction expressions which apply specified arithmetic operations to input data and in which one or more operators (operators) are combined. Accordingly, the low-level feature quantity extraction section 12 outputs m kinds of low-level feature quantities to the high-level feature quantity extraction section 14.

Figure 3A:
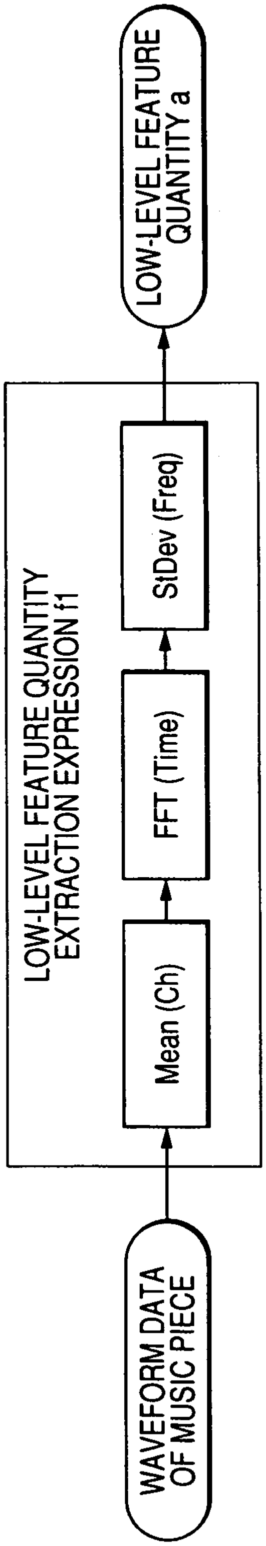
FIGS. 3A and 3B are views showing examples of a low-level feature quantity extraction expression.
Figure 3B:
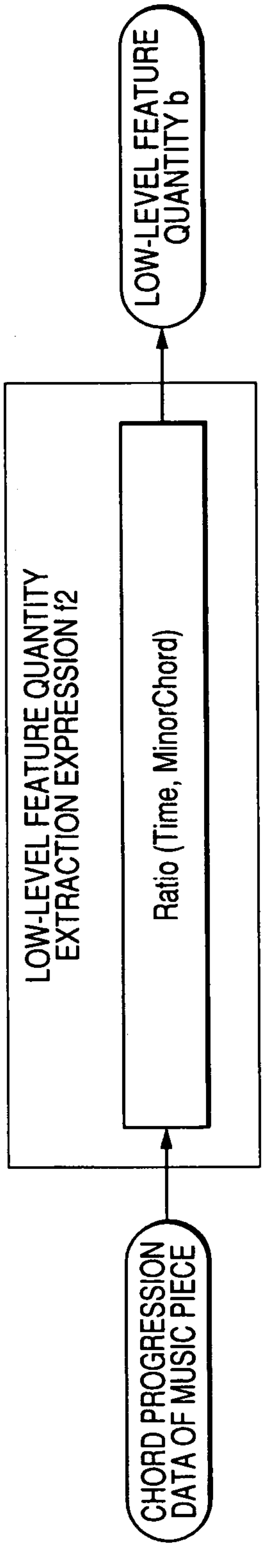

FIGS. 3A and 3B show examples of a low-level feature quantity extraction expression. For example, in a low-level feature quantity extraction expression f1 shown in FIG. 3A, waveform data of a music piece is inputted, a mean value (Mean) of the waveform data is calculated between respective channels (for example, L (Left) channel and R (Right) channel), the calculated mean value is subjected to fast Fourier transform (FFT) along a time axis, a standard deviation (StDev) of frequency is obtained from the FFT result, and the result is outputted as a low-level feature quantity "a".

Besides, for example, in a low-level feature quantity extraction expression f2 shown in FIG. 3B, chord progression data of a music piece is inputted, an appearance ratio (Ratio) of a minor chord is obtained along a time axis, and the result is outputted as a low-level feature quantity "b".

Incidentally, it is unnecessary that each of the low-level feature quantities as the output of the low-level feature quantity extraction section 12 is a significant value.

The high-level feature quantity extraction section 14 includes k kinds of high-level feature quantity extraction expressions which carry out relatively simple arithmetic operations (four arithmetic operation, power operation, etc.) on one or more kinds of low-level feature quantities among the inputted m kinds of low-level feature quantities, and outputs the arithmetic results as the high-level feature quantities. Accordingly, the high-level feature quantity extraction section 14 outputs k kinds of high-level feature quantities.

Figure 4A:
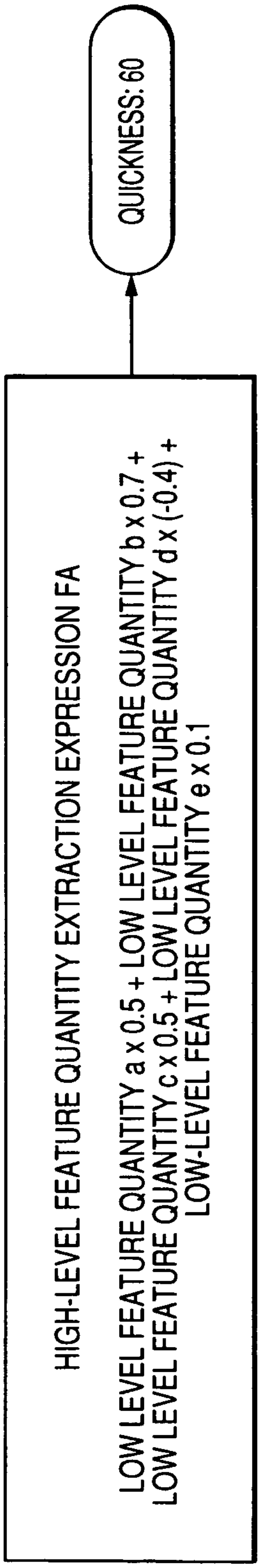
FIGS. 4A and 4B are views showing examples of a high-level feature quantity extraction expression.
Figure 4B:
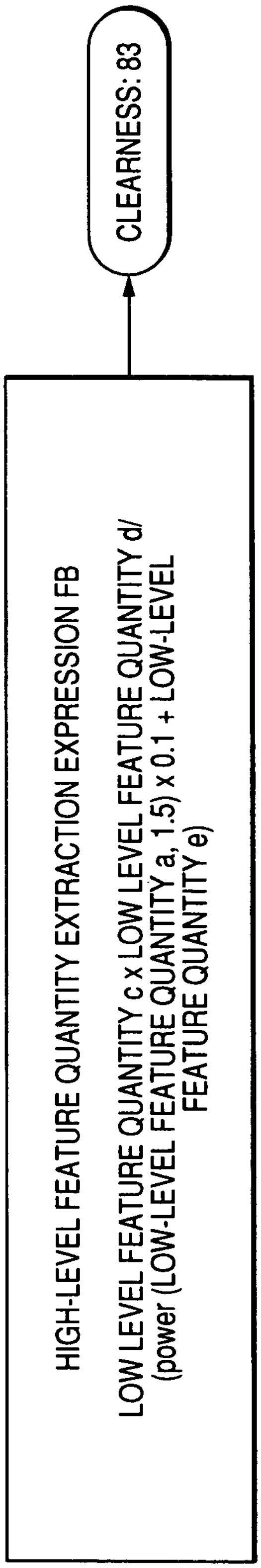

FIGS. 4A and 4B show examples of a high-level feature quantity extraction expression. For example, in a high-level feature quantity extraction expression F1 shown in FIG. 4A, the four arithmetic operations are performed on low-level feature quantities “a”, “b”, “c”, “d” and “e”, and the result is outputted as a value of quickness as one kind of high-level feature quantity.

Besides, for example, in a high-level feature quantity extraction expression F2 shown in FIG. 4B, the four arithmetic operations and the power operation are performed on low-level feature quantities “a”, “c”, “d” and “e”, and the result is outputted as a value of clearness as one kind of high-level feature quantity.

Next, FIG. 5 shows a structural example of a feature quantity extraction algorithm creation apparatus 20 of an embodiment of the invention. The feature quantity extraction algorithm creation apparatus 20 creates an optimum low-level feature quantity extraction expression and a high-level feature quantity extraction expression by genetic (Genetic) learning, and includes a low-level feature quantity extraction expression list creation section 21 to create n low-level feature quantity extraction expression lists each having m kinds of low-level feature quantity extraction expressions, a low-level feature quantity arithmetic section 24 to obtain n sets each including m kinds of low-level feature quantities corresponding to respective input data by substituting the input data (content data and metadata) of one music piece into the n low-level feature quantity extraction expression lists supplied from the low-level feature quantity extraction expression list creation section 21, a high-level feature quantity extraction expression learning section 25 to estimate a high-level feature quantity extraction expression by learning based on teacher data (high-level feature quantities of k items respectively corresponding to one music piece) corresponding to n sets of outputs from the low-level feature quantity arithmetic section 24, a high-level feature quantity arithmetic section 26 to calculate a high-level feature quantity by using a high-level feature quantity extraction expression finally created through the progress of the learning, and a control section 27 to control a repetition (loop) of an action of each section.

The low-level feature quantity extraction expression list creation section 21 creates a first generation low-level feature quantity extraction expression list at random, and creates a second or subsequent generation low-level feature quantity extraction expression list based on the precision of a high-level feature quantity extraction expression learned by using a low-level feature quantity based on the former generation low-level feature quantity extraction expression list.

An operator set detection section 22 included in the low-level feature quantity extraction expression list creation section 21 detects a combination of plural operators frequently appearing in the created low-level feature quantity extraction expressions. An operator creation section 23 registers the combination of the plural operators detected by the operator set detection section 22 as one kind of new operator.

The high-level feature quantity extraction expression learning section 25 creates k kinds of high-level feature quantity extraction expressions corresponding to n sets of low-level feature quantities, calculates estimated precision of each high-level feature quantity extraction expression and a contribution ratio of each low-level feature quantity in each high-level feature quantity extraction expression, and outputs them to the low-level feature quantity extraction expression list creation section 21. Besides, the high-level feature quantity extraction expression learning section 25 supplies, at the final generation of learning, m sets of low-level feature quantity extraction expressions of a list in which the mean precision of obtained high-level feature quantities is highest among n sets of low-level feature quantity extraction expression lists, and k kinds of high-level feature quantity extraction expressions corresponding thereto to the high-level feature quantity arithmetic section 26.

The high-level feature quantity arithmetic section 26 uses the low-level feature quantity extraction expressions finally supplied from the high-level feature quantity extraction expression learning section 25 and the high-level feature quantity extraction expressions and calculates the high-level feature quantities.

Figure 6:
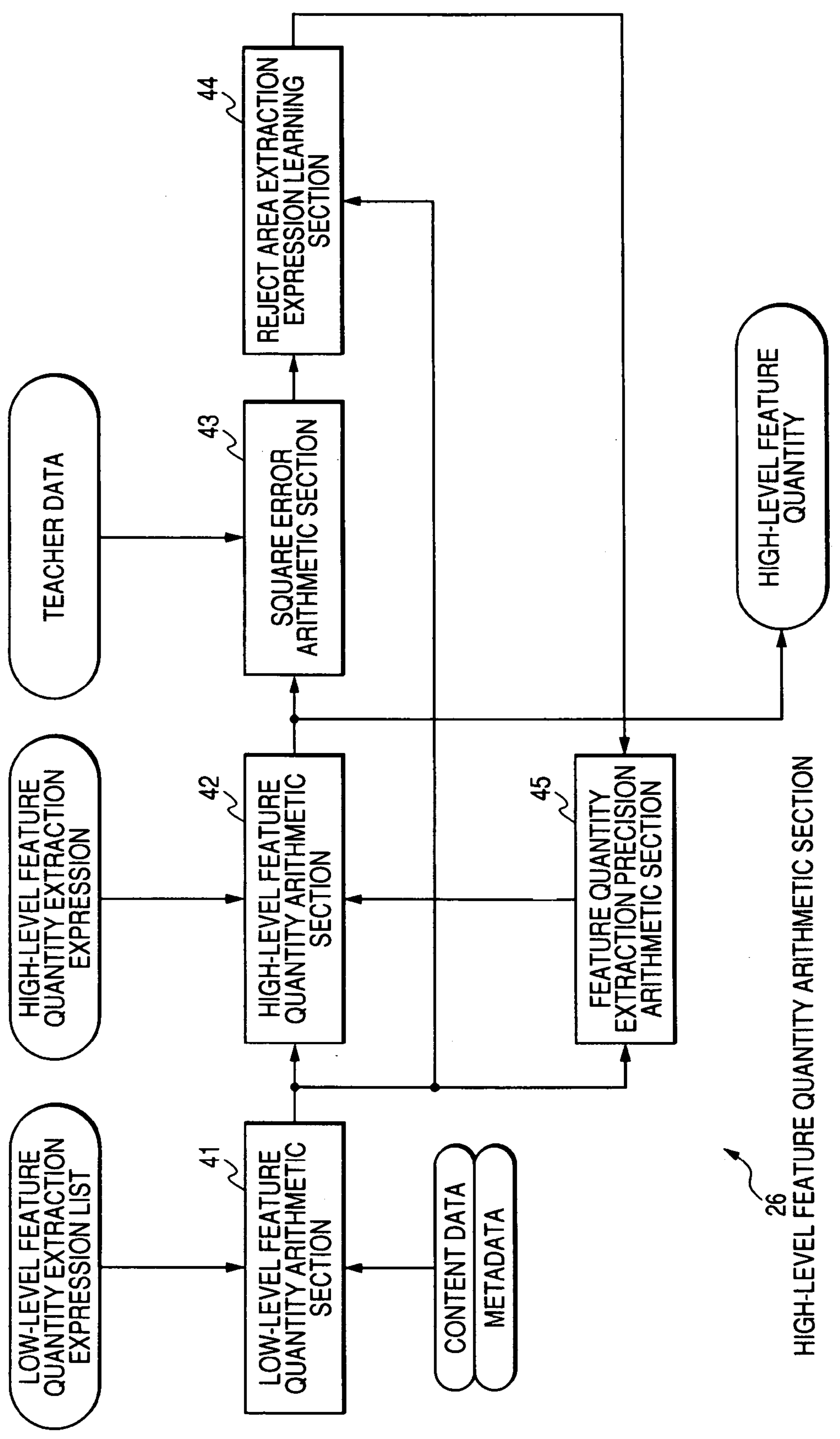
FIG. 6 is a block diagram showing a structural example of a high-level feature quantity arithmetic section of FIG. 5.

FIG. 6 shows a detailed structural example of the high-level feature quantity arithmetic section 26.

The high-level feature quantity arithmetic section 26 includes a low-level feature quantity arithmetic section 41 which substitutes input data (content data and metadata corresponding thereto) into the final low-level feature quantity extraction expression list and calculates the low-level feature quantity, a high-level feature quantity arithmetic section 42 which substitutes the arithmetic result by the low-level feature quantity arithmetic section 41 into the final high-level feature quantity extraction expression and calculates the high-level feature quantity, a square error arithmetic section 43 which calculates the square error of the arithmetic result of the high-level feature quantity arithmetic section 42 and teacher data (high-level feature quantity corresponding to the input data), a reject area extraction expression learning section 44 which creates, by learning, a reject area extraction expression in which the low-level feature quantity as the arithmetic result of the low-level feature quantity arithmetic section 41 is inputted and the square error as the arithmetic result of the square error arithmetic section 43 is outputted, and a feature quantity extraction precision arithmetic section 45 which substitutes input data into the reject area extraction expression created by the reject area extraction expression learning section 44, estimates the feature extraction precision (square error) of the high-level feature quantity calculated correspondingly to the input data, and causes the high-level feature quantity arithmetic section 42 to calculates the high-level feature quantity only in the case where the estimated feature extraction precision is a specified threshold or higher.

Next, the operation of the feature quantity extraction algorithm creation apparatus 20 will be described.

Figure 7:
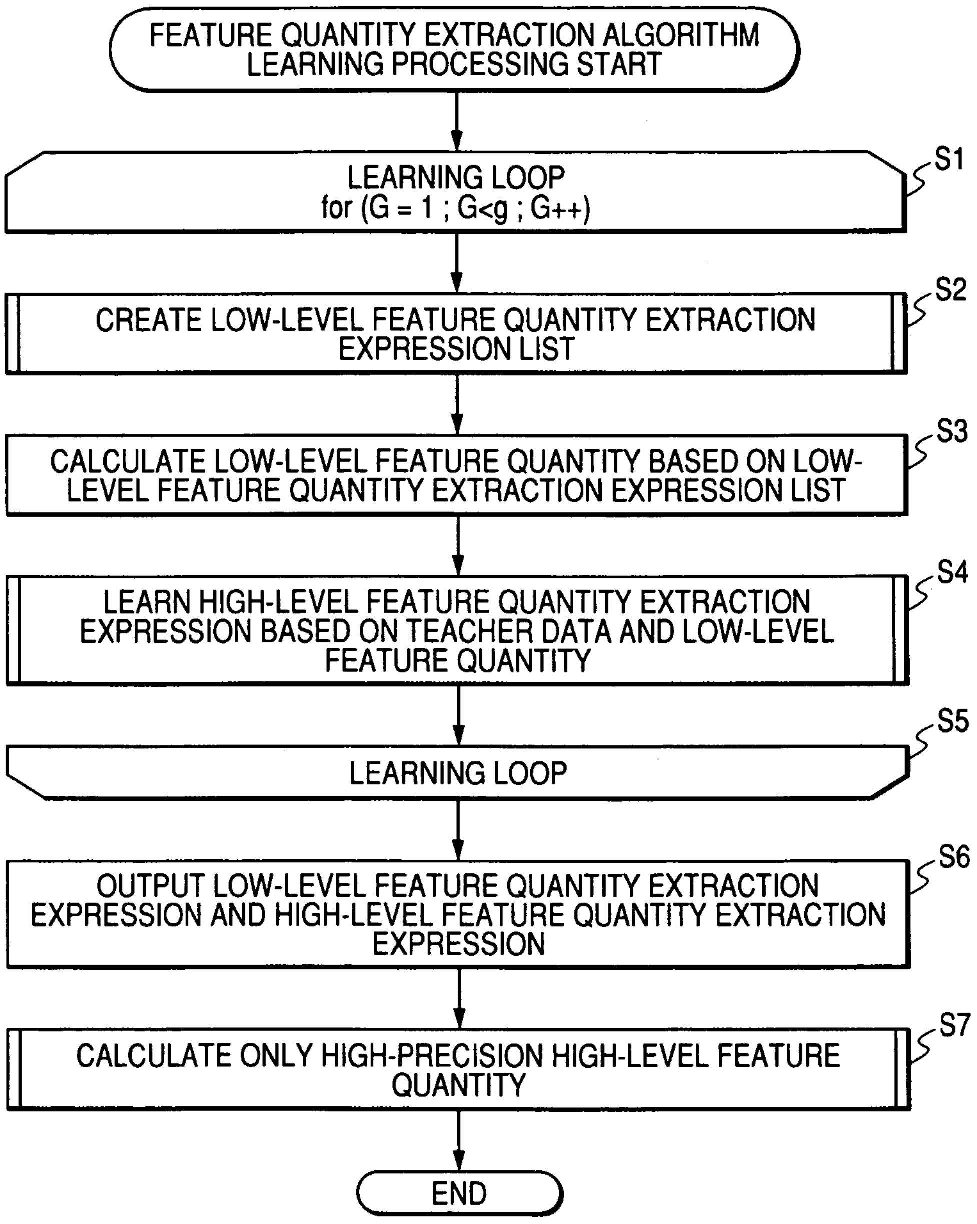
FIG. 7 is a flowchart for explaining a feature quantity extraction algorithm learning processing.

FIG. 7 is a flowchart for explaining a feature quantity extraction algorithm creation processing as a basic operation of the feature quantity extraction algorithm creation apparatus 20.

At step S1, the control section 27 initializes a learning loop parameter G to 1 and starts a learning loop. Incidentally, the learning loop is repeated by a learning number g previously set by the user or the like.

Figure 8:
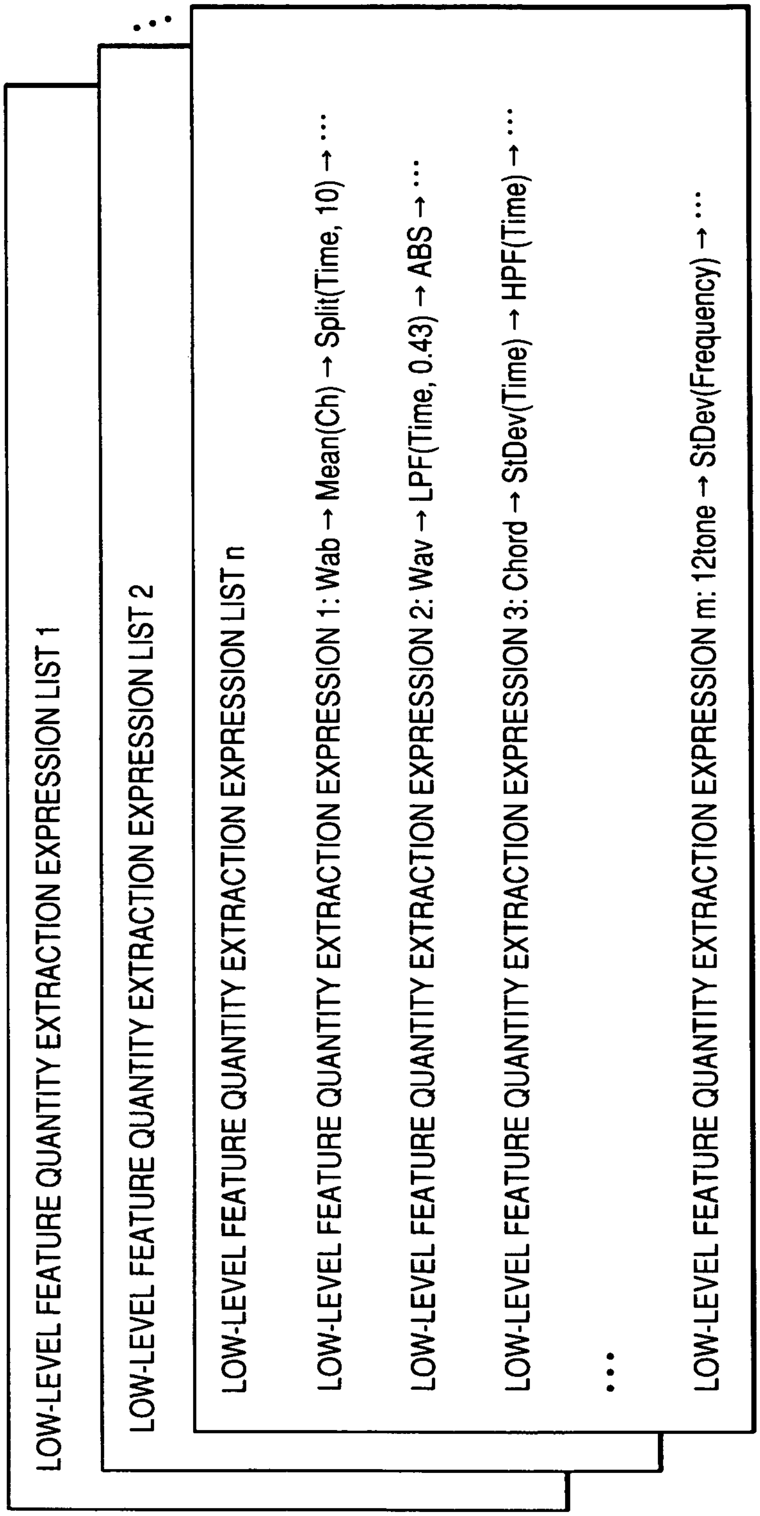
FIG. 8 is a view showing an example of a low-level feature quantity extraction expression list.

At step S2, the low-level feature quantity extraction expression list creation section 21 creates n low-level feature quantity extraction expression lists each having m kinds of low-level feature quantity extraction expressions as shown in FIG. 8, and outputs them to the low-level feature quantity arithmetic section 24.

Figure 9:
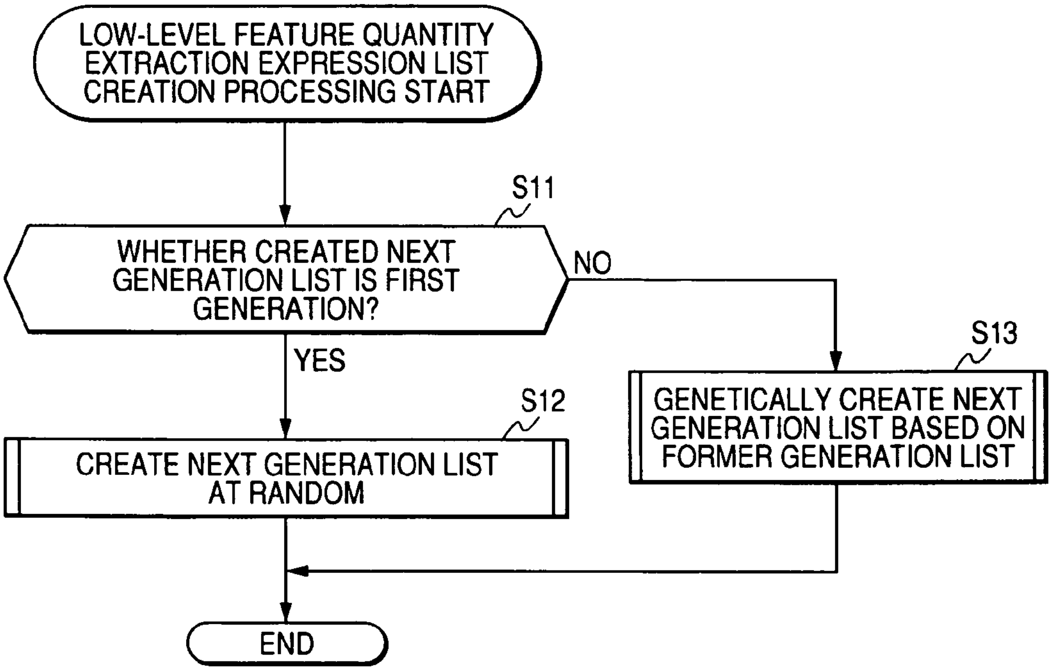
FIG. 9 is a flowchart for explaining a low-level feature quantity extraction expression list creation processing.

With respect to the processing (low-level feature quantity extraction expression list creation processing) of step S2 will be described with reference to a flowchart of FIG. 9.

At step S11, the low-level feature quantity extraction expression list creation section 21 judges whether or not the low-level feature quantity extraction expression list to be created is the first generation. Incidentally, this judgment is made such that when the learning loop parameter G is 0, the low-level feature quantity extraction expression list to be created is the first generation. In the case where it is judged that the low-level feature quantity extraction expression list to be created is the first generation, the processing proceeds to step S12. At step S12, the low-level feature quantity extraction expression list creation section 21 creates first generation low-level feature quantity extraction expression lists at random.

On the other hand, at step S11, in the case where it is judged that the low-level feature quantity extraction expression list to be created is not the first generation, the processing proceeds to step S13. At step S13, the low-level feature quantity extraction expression list creation section 21 creates genetically a next generation low-level feature quantity extraction expression list based on the former generation low-level feature quantity extraction expression list.

Figure 10:
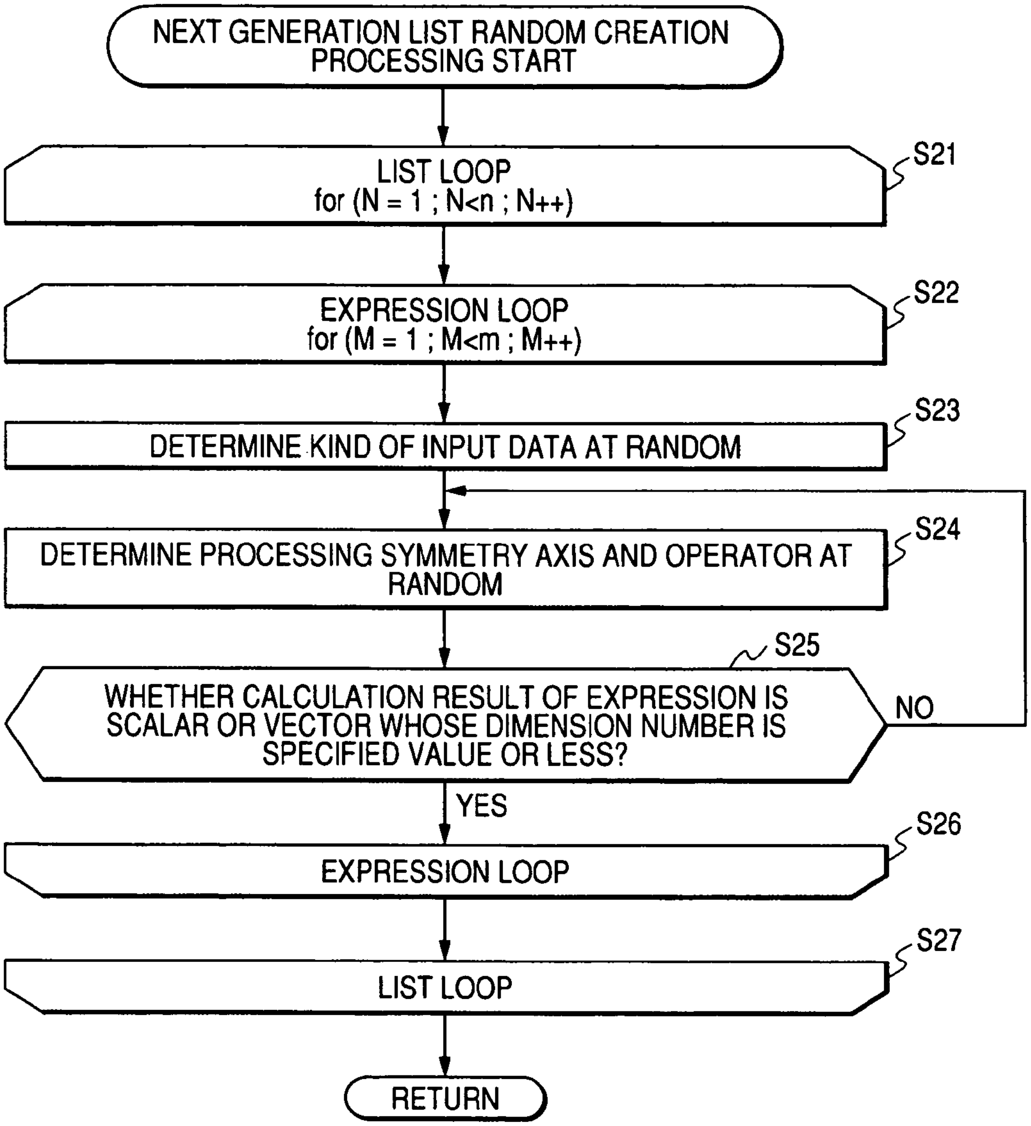
FIG. 10 is a flowchart for explaining a first generation list random creation processing.

The processing (first generation list random creation processing) of step S12 will be describe with reference to FIG. 10. At step S21, the control unit 27 initializes a list loop parameter N to 1 and starts a list loop. Incidentally, the list loop is repeated by a previously set list number n.

At step S22, the control unit 27 initializes an expression loop parameter M to 1 and starts an expression loop. Incidentally, the expression loop is repeated by the number m of low-level feature quantity extraction expressions constituting one low-level feature quantity extraction expression list.

Here, a describing method of a low-level feature quantity extraction expression created in the expression loop will be described with reference to FIG. 11. In the low-level feature quantity extraction expression, input data is described at the left end, and one or more kinds of operators are described at the right side correspondingly to the order of arithmetic operation. Each operator suitably includes a processing symmetry axis and a parameter.

Figure 11:
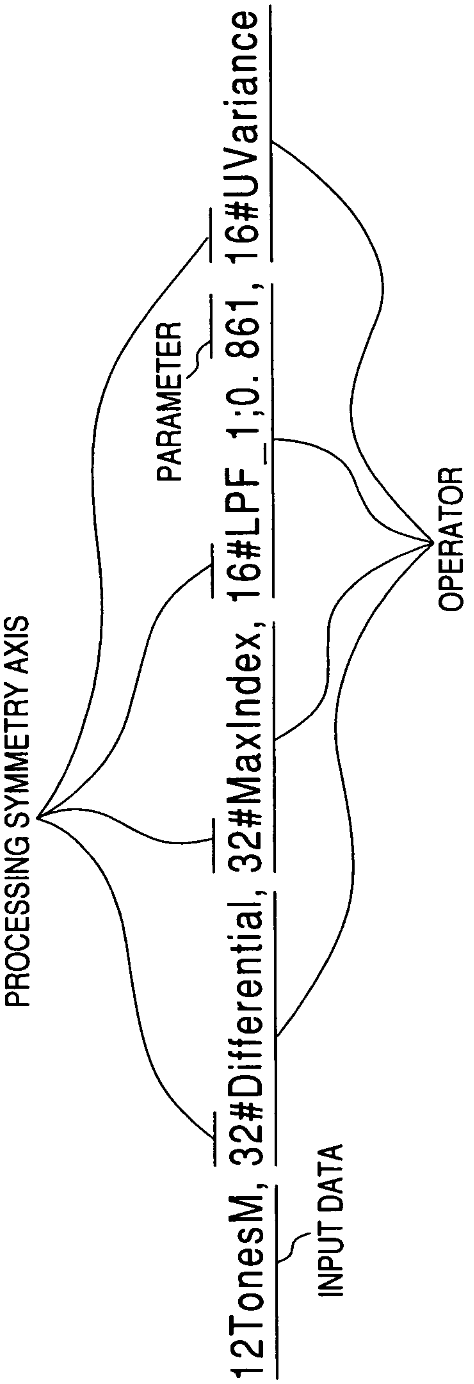
FIG. 11 is a view showing a description method of a low-level feature quantity extraction expression.

For example, in the case of an example of FIG. 11, 12TomesM is the input data, 32#Differential, 32#MaxIndex, 16#LPF__1; 0.861 and the like are the operators. Besides, 32#, 16# or the like in the operator denotes the processing symmetry axis. For example, 12TomesM denotes that the input data is monaural PCM (pulse coded modulation sound source) waveform data in the time axis direction. 48# indicates a channel axis, 32# indicates a frequency axis and a tone axis, and 16# denotes a time axis. 0.861 in the operator denotes a parameter in a low-pass filter processing, and indicates, for example, a threshold of a frequency allowed to pass through.

Return is made to FIG. 10. At step S23, the low-level feature quantity extraction expression list creation section 21 determines the input data of the low-level feature quantity extraction expression M of the created list N at random.

Figures 12, 13:
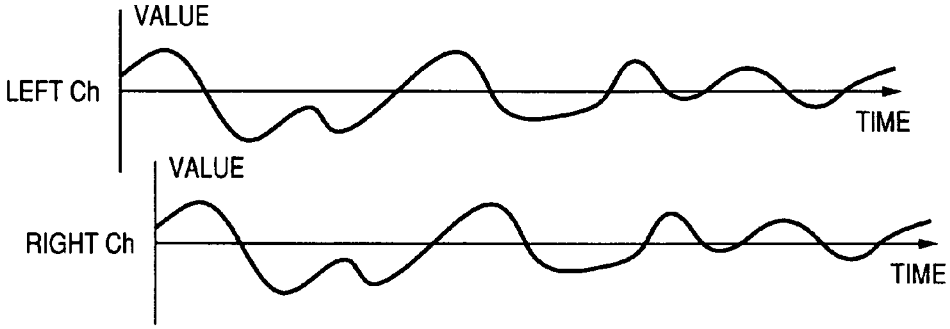
FIG. 12 is a view showing an example of input data.
FIG. 13 is a view for explaining input data Wav.

As the kinds of the input data, for example, Wav, 12Tones, Chord, Key and the like shown in FIG. 12 are conceivable. WAV as the input data is PCM waveform data as shown in FIG. 13, and the holding dimension is the time axis and the channel axis. 12Tones as the input data is such that the PCM waveform data is analyzed along the time axis for each tone, and the holding dimension is the time axis and the tone axis. Chord as the input data is data indicating chord progression (C, C#, D, . . . , Bm) of a music piece as shown in FIG. 14, and the holding dimension is the time axis and the tone axis. Key as the input data is data indicating keys (C, C#, D, . . . , B) of a music piece, and the holding dimension is the time axis and the tone-axis.

Return is made to FIG. 10. At step S24, the low-level feature quantity extraction expression list creation section 21 determines one processing symmetry axis and one parameter of the low-level feature quantity extraction expression M of the list N to be created at random. As the kinds of the parameter, a mean value (Mean), fast Fourier transform (FFT), standard deviation (StDev), appearance ratio (Ratio), low-pass filter (LPF), high-pass filter (HPF), absolute value (ABS), differential (Differential), maximum value (MaxIndex), unbiased variance (UVariance) and the like are conceivable. Incidentally, since the processing symmetry axis may be fixed according to the determined operator, in that case, the processing symmetry axis fixed to the parameter is adopted. Besides, in the case where an operator requiring a parameter is determined, the parameter is also determined at random or to be a previously set value.

Figure 16:
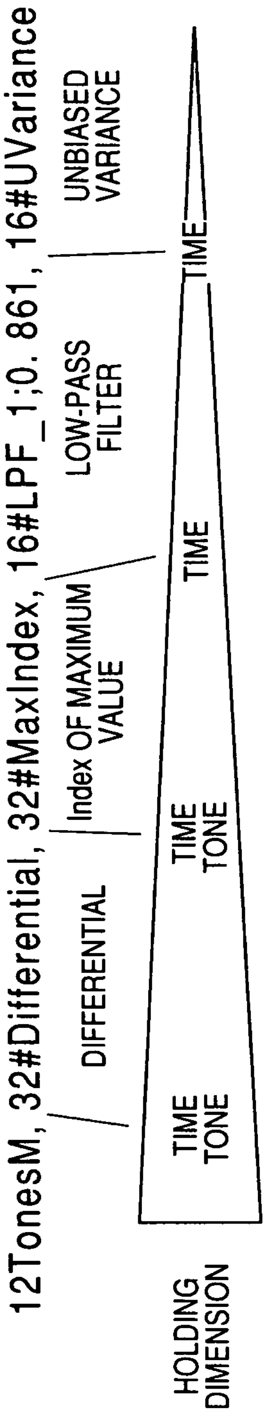
FIG. 16 is a view for explaining a holding dimension of a low-level feature quantity extraction expression.

At step S25, the low-level feature quantity extraction expression list creation section 21 judges whether or not the arithmetic result of the low-level feature quantity extraction expression M of the list N created at the present time point is scalar (one-dimensional) or the dimension number is a specified value (for example, a small number such as 1 or 2) or less, and in the case of a negative judgment, return is made to the processing of step S24, and one operator is added. As shown in FIG. 16, the number of holding dimensions of the arithmetic result is decreased, and at step S25, in the case where it is judged that the arithmetic result of the low-level feature quantity extraction expression M of the list N is scalar or the number of dimensions is a specified value (for example, a small number such as 1 or 2) or less, the processing proceeds to step S26.

At step S26, the control section 27 judges whether or not the expression loop parameter M is smaller than the maximum value m, and in the case where the expression loop parameter M is smaller than the maximum value m, the expression loop parameter M is incremented by 1 and the processing is returned to step S23. On the other hand, the expression loop parameter M is not smaller than the maximum value m (in the case where the expression loop parameter M is equal to the maximum value m), the processing exits from the expression loop and proceeds to step S27. By the processing up to this point, one low-level feature quantity extraction expression list is created.

At step S27, the control unit 27 judges whether or not the list loop parameter N is smaller than the maximum value n, and in the case where the list loop parameter N is smaller than the maximum value n, the list loop parameter N is incremented by 1, and the processing is returned to step S22. On the other hand, in the case where the list loop parameter N is not smaller than the maximum value n (in the case where the list loop parameter N is equal to the maximum value n), the first generation list random creation processing exits from the list loop and is ended. By the processing up to this point, n first generation low-level feature quantity extraction expression lists are created.

Figure 17:
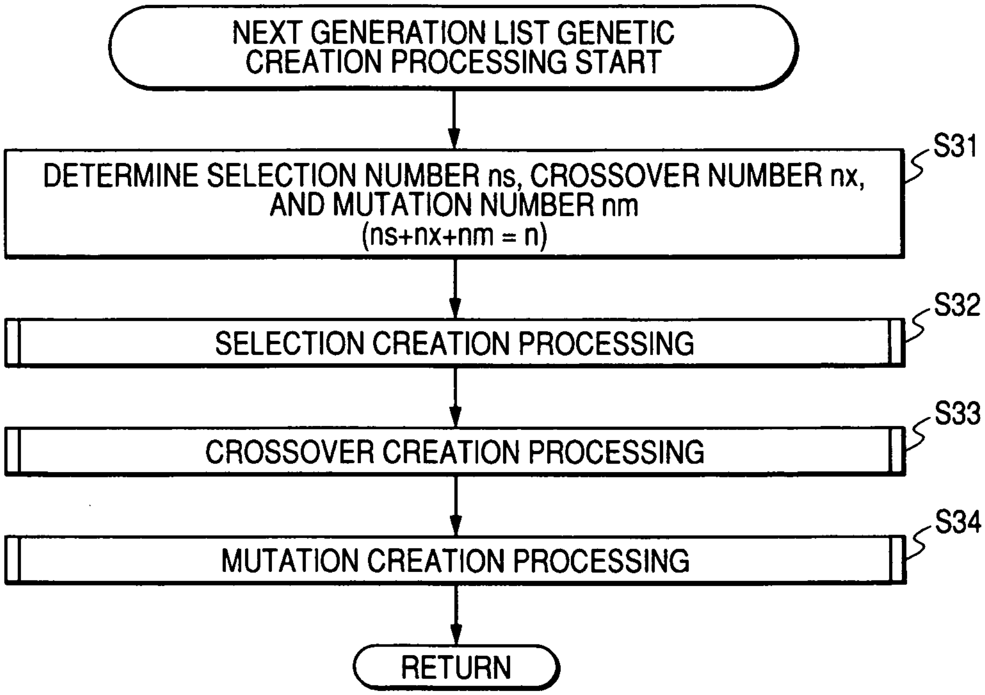
FIG. 17 is a flowchart for explaining a next generation list genetic creation processing.

Next, the processing (next generation list genetic creation processing) of step S13 of FIG. 9 will be described with reference to FIG. 17. At step S31, the low-level feature quantity extraction expression list creation section 21 determines a selection number ns, a crossover number nx, and a mutation number nm at random. Where, the sum of the selection number ns, the crossover number nx, and the mutation number nm is made n. Incidentally, previously set constants may be adopted for the selection number ns, the crossover number nx, and the mutation number nm.

At step S32, the low-level feature quantity extraction expression list creation section 21 creates ns low-level feature quantity extraction expression lists based on the determined selection number ns. At step S33, the low-level feature quantity extraction expression list creation section 21 creates nx low-level feature quantity extraction expression lists based on the determined crossover number nx. At step S34, the low-level feature quantity extraction expression list creation section 21 creates nm low-level feature quantity extraction expression lists based on the determined mutation number nm.

Figure 18:
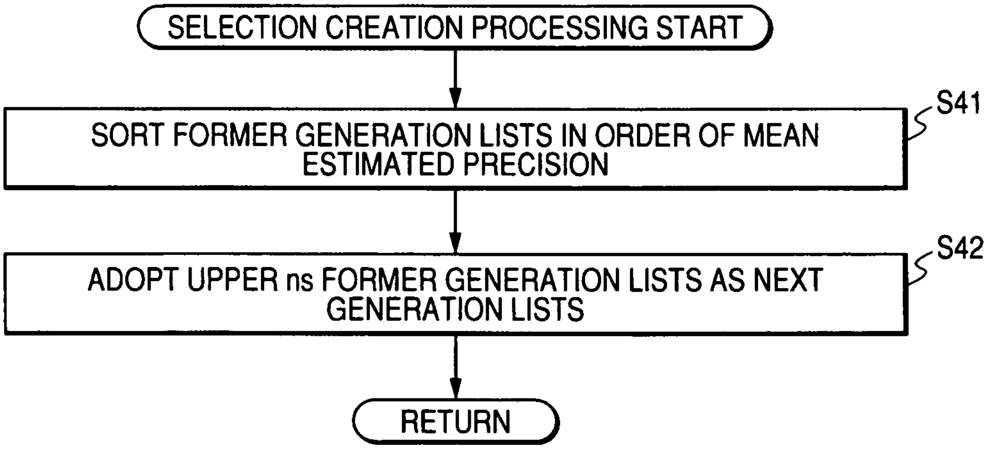
FIG. 18 is a flowchart for explaining a selection creation processing.

The selection creation processing of step S32 will be described in detail with reference to a flowchart of FIG. 18. In this selection creation processing, among n next generation low-level feature quantity extraction expression lists, the lists the number of which is the selection number ns are created.

At step S41, the low-level feature quantity extraction expression list creation section 21 rearranges the n former generation (one generation before) low-level feature quantity extraction expression lists in the descending order of the mean value of the estimated precision of the high-level feature quantity extraction expression inputted from the high-level feature quantity extraction expression learning section 25. At step S32, the low-level feature quantity extraction expression list creation section 21 adopts, as next generation low-level feature quantity extraction expression lists, upper ns lists of the n rearranged former low-level feature quantity extraction expression lists. Here, the selection creation processing is ended.

Figure 19:
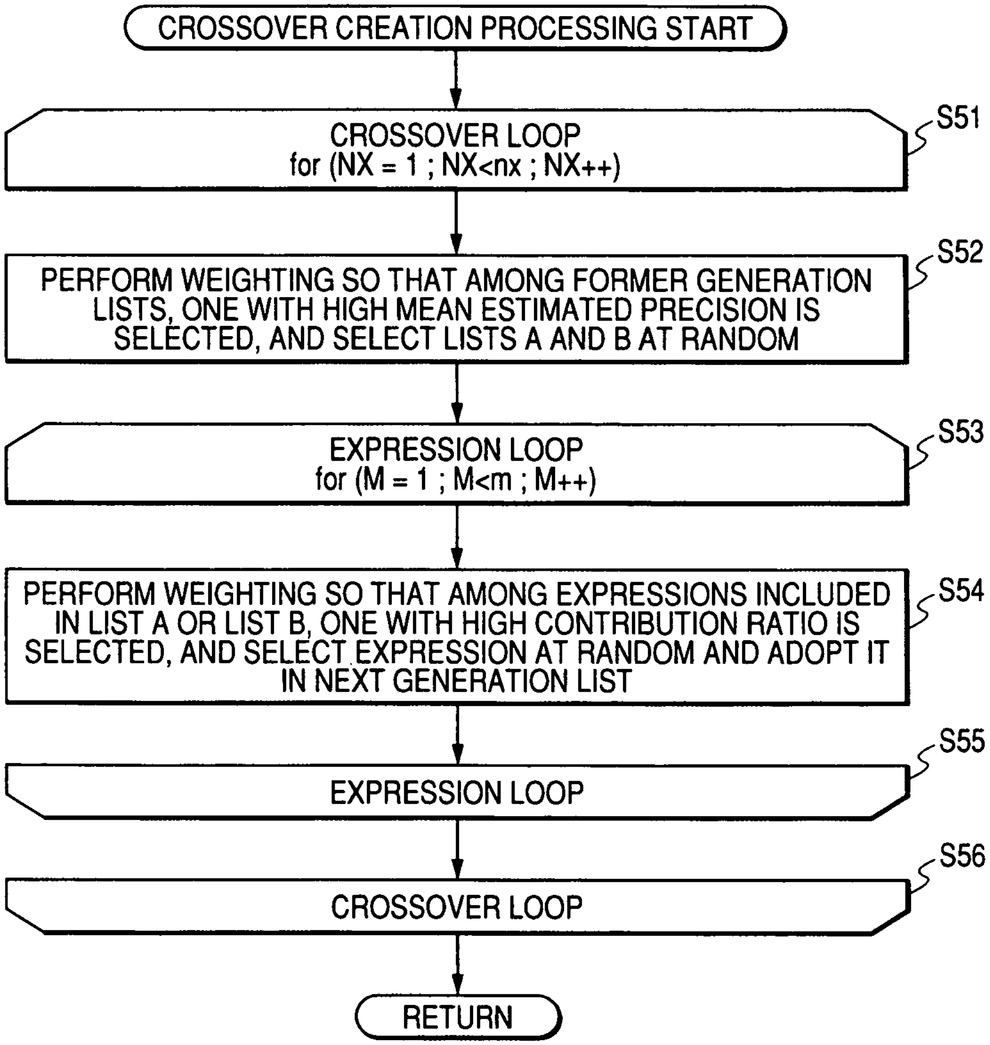
FIG. 19 is a flowchart for explaining a crossover creation processing.

The crossover creation processing of step S33 of FIG. 17 will be described with reference to a flowchart of FIG. 19. In this crossover creation processing, among the n next generation low-level feature quantity extraction expression lists, lists the number of which is the crossover number nx are created.

At step S51, the control unit 27 initializes a crossover loop parameter NX to 1 and starts a crossover loop. Incidentally, the crossover loop is repeated by the crossover number nx.

At step S52, the low-level feature quantity extraction expression list creation section 21 performs weighting so that from the former generation low-level feature quantity extraction expression lists, one with a high mean value of estimated precision of the high-level feature quantity extraction expression inputted from the high-level feature quantity extraction expression learning section 25 is preferentially selected, and then, two low-level feature quantity extraction expression lists A and B are selected at random. Incidentally, in the selection here, the ns low-level feature quantity extraction expression lists selected in the foregoing selection creation processing may be excluded from selection candidates or may remain as the selection candidates.

At step S53, the control unit 27 initializes an expression loop parameter M to 1 and starts an expression loop. Incidentally, the expression loop is repeated by the number m of expressions included in one low-level feature quantity extraction expression list.

At step S54, the low-level feature quantity extraction expression list creation section 21 performs weighting so that from 2 m low-level feature quantity extraction expressions included in the low-level feature quantity extraction expression lists A and B, one with a high contribution ratio in the high-level feature quantity extraction expression inputted from the high-level feature quantity extraction expression learning section 25 is preferentially selected, and then, one low-level feature quantity extraction expression is selected at random and is added to the next generation low-level feature quantity extraction expression list.

At step S55, the control section 27 judges whether or not the expression loop parameter M is smaller than the maximum value m, and in the case where the expression loop parameter M is smaller than the maximum value m, the expression loop parameter M is incremented by one, and the processing is returned to step S54. On the other hand, in the case where the expression loop parameter M is not smaller than the maximum value m (in the case where the expression loop parameter M is equal to the maximum value m), the processing exits from the expression loop and proceeds to step S56. By the processing up to this point, one low-level feature quantity extraction expression list is created.

At step S56, the control unit 27 judges whether or not the crossover loop parameter NX is smaller than the maximum value nx, and in the case where the crossover loop parameter NX is smaller than the maximum value nx, the crossover loop parameter nx is incremented by 1 and the processing is returned to step S52. On the other hand, the crossover loop parameter NX is not smaller than the maximum value nx (in the case where the crossover loop parameter NX is equal to the maximum value nx), the crossover creation processing exits from the crossover loop and is ended. By the processing up to this point, low-level feature quantity extraction expression lists the number of which is the crossover number nx are created.

Figure 20:
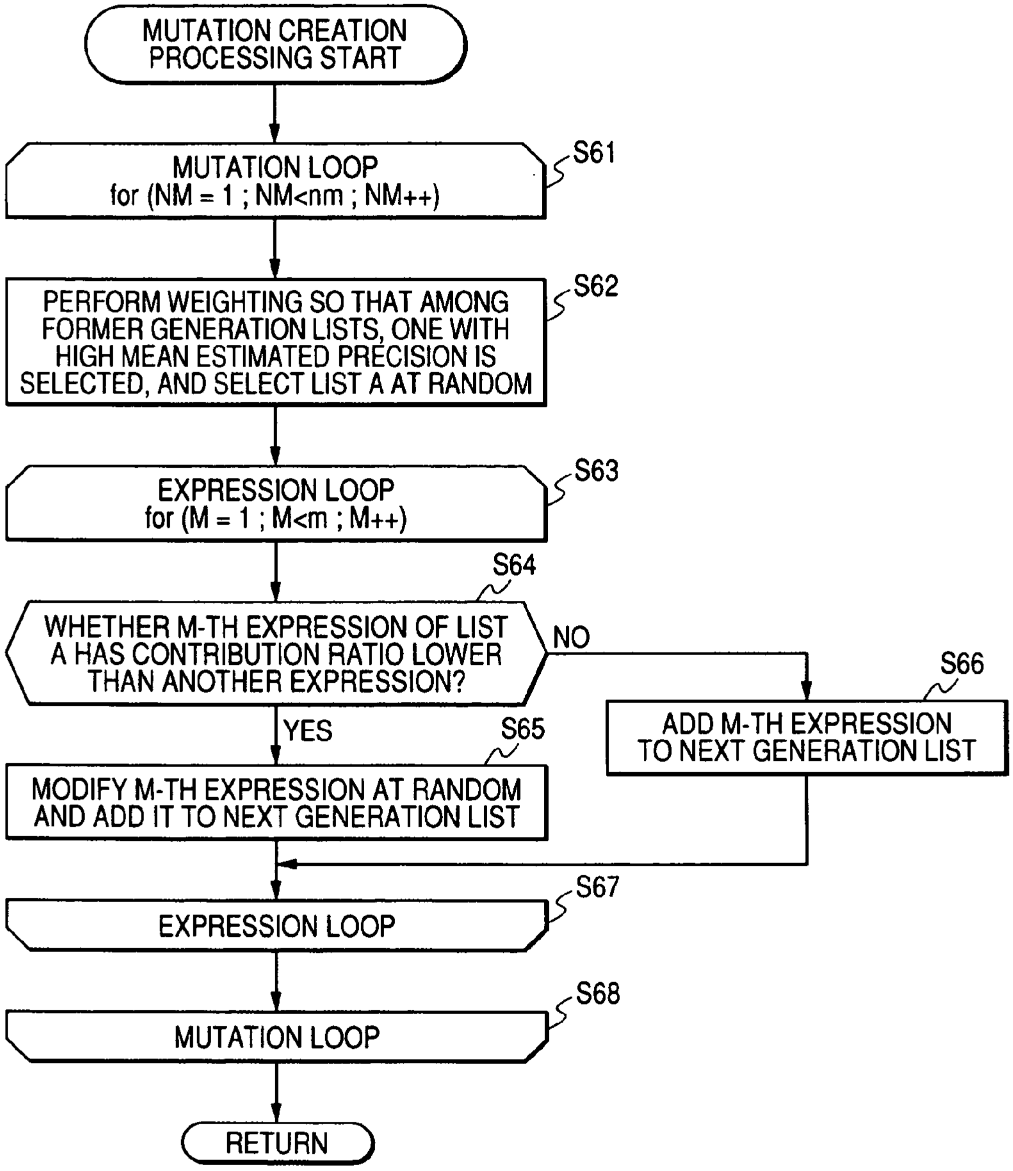
FIG. 20 is a flowchart for explaining a mutation creation processing.

The mutation creation processing of step S34 of FIG. 17 will be described with reference to a flowchart of FIG. 20. In this mutation creation processing, among the n next generation low-level feature quantity extraction expression lists, lists the number of which is the mutation number nm are created.

At step S61, the control section 27 initializes a mutation loop parameter NM to 1 and starts a mutation loop. Incidentally, the mutation loop is repeated by the mutation number nm.

At step S62, the low-level feature quantity extraction expression list creation section 21 performs weighting so that from the former generation low-level feature quantity extraction expression lists, one with a high-mean value of the estimated precision of the high-level feature quantity extraction expression inputted from the high-level feature quantity extraction expression learning section 25 is preferentially selected, and then, one low-level feature quantity extraction expression list A is selected at random. Incidentally, in the selection here, the ns low-level feature quantity extraction expression lists selected in the selection creation processing may be excluded from selection candidates or may remain as the selection candidates. Besides, the low-level feature quantity extraction expression lists selected in the processing of step S52 of the crossover creation processing may be removed from the selection candidates or may remain as the selection candidates.

At step S63, the control section 27 initializes an expression loop parameter M to 1 and starts an expression loop. Incidentally, the expression loop is repeated by the number m of expressions included in one low-level feature quantity extraction expression list.

At step S64, the low-level feature quantity extraction expression list creation section 21 pays attention to the M-th one of m low-level feature quantity extraction expressions included in the low-level feature quantity extraction expression list A, and judges whether or not the contribution ratio of the low-level feature quantity as the arithmetic result of the M-th low-level feature quantity extraction expression is low as compared with the contribution ratio of the low-level feature quantity as the arithmetic result of the other low-level feature quantity extraction expression included in the low-level feature quantity extraction expression list A. Specifically, for example, among m low-level feature quantity extraction expressions included in the low-level feature quantity extraction expression list A, it is judged whether the contribution ratio of the low-level feature quantity as the arithmetic result falls within a specified rank in ascending order.

At step S64, in the case where it is judged that the contribution ratio of the low-level feature quantity as the arithmetic result of the M-th low-level feature quantity extraction expression is lower than those of the others, the processing proceeds to step S65, and the low-level feature quantity extraction expression list creation section 21 modifies the M-th low-level feature quantity extraction expression at random, and adds it to the next generation low-level feature quantity extraction expression list.

On the other hand, at step S64, in the case where it is judged that the contribution ratio of the low-level feature quantity as the arithmetic result of the M-th low-level feature quantity extraction expression is not lower than those of the others, the processing proceeds to step S66, and the low-level feature quantity extraction expression list creation section 21 adds the M-th low-level feature quantity extraction expression to the next generation low-level feature quantity extraction expression list as it is.

At step S67, the control section 27 judges whether or not the expression loop parameter M is smaller than the maximum value m, and in the case where the expression loop parameter M is smaller than the maximum value m, the expression loop parameter M is incremented by 1 and the processing is returned to step S64. On the other hand, in the case where the expression loop parameter M is not smaller than the maximum value m (in the case where the expression loop parameter M is equal to the maximum value m), the processing exits from the expression loop and proceeds to step S68. By the processing up to this point, one low-level feature quantity extraction expression list is created.

At step S68, the control section 27 judges whether or not the mutation loop parameter NM is smaller than the maximum value nm, and in the case where the mutation loop parameter NM is smaller than the maximum value nm, the mutation loop parameter NM is incremented by 1, and the processing is returned to step S62. On the other hand, in the case where the mutation loop parameter NM is not smaller than the maximum value nm (in the case where the mutation loop parameter NM is equal to the maximum value nm), the mutation creation processing exits from the mutation loop and is ended. By the processing up to this point, the low-level feature quantity extraction expression lists the number of which is the mutation number nm are created.

According to the next generation list genetic creation processing as described above, a low-level feature quantity extraction expression list corresponding to a former generation one and having a high estimated precision, and a low-level feature quantity extraction expression corresponding to a former generation one and having a high contribution ratio are inherited to the next generation, and one with a low estimated precision or low contribution ratio is not inherited to the next generation and is weeded out. Accordingly, it is expected that as the generation proceeds, the estimated precision corresponding to the low-level feature quantity extraction expression list is improved, and the contribution ratio corresponding to the low-level feature quantity extraction expression is also improved.

Return is made to FIG. 7. At step S3, the low-level feature quantity arithmetic section 24 substitutes input data (content data and metadata) of one music piece of music pieces C1 to Cl into the n low-level feature quantity extraction expression lists inputted from the low-level feature quantity extraction expression list creation section 21 and calculates the low-level feature quantity. Incidentally, the input data of one music piece inputted here is such that teacher data (corresponding high-level feature quantity) of k items have been previously obtained. For example, in the case where the low-level feature quantity arithmetic section 24 performs an arithmetic operation equivalent to the operator of #16Mean on the input data in which as shown in FIG. 21A, the holding dimension includes a tone axis and a time axis, as shown in FIG. 21B, the time axis is made the processing object axis, and the mean value of values of the respective tones is calculated.

Figure 22:
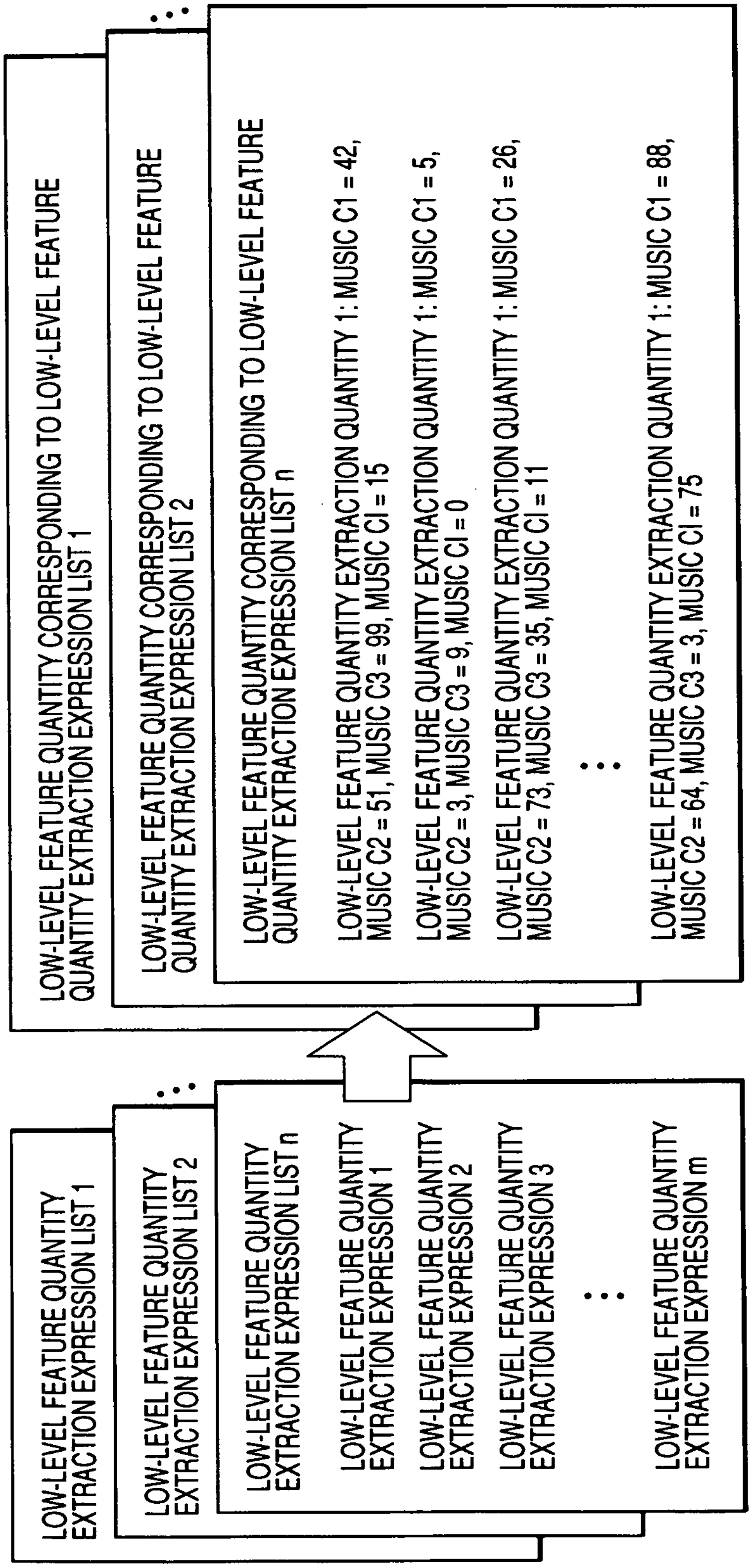
FIG. 22 is a view for explaining a processing of a low-level feature quantity arithmetic section.

As shown in FIG. 22, m kinds of low-level feature quantities corresponding to each of n sets of input data obtained as the arithmetic result are outputted to the high-level feature quantity extraction expression learning section 25.

Figure 23:
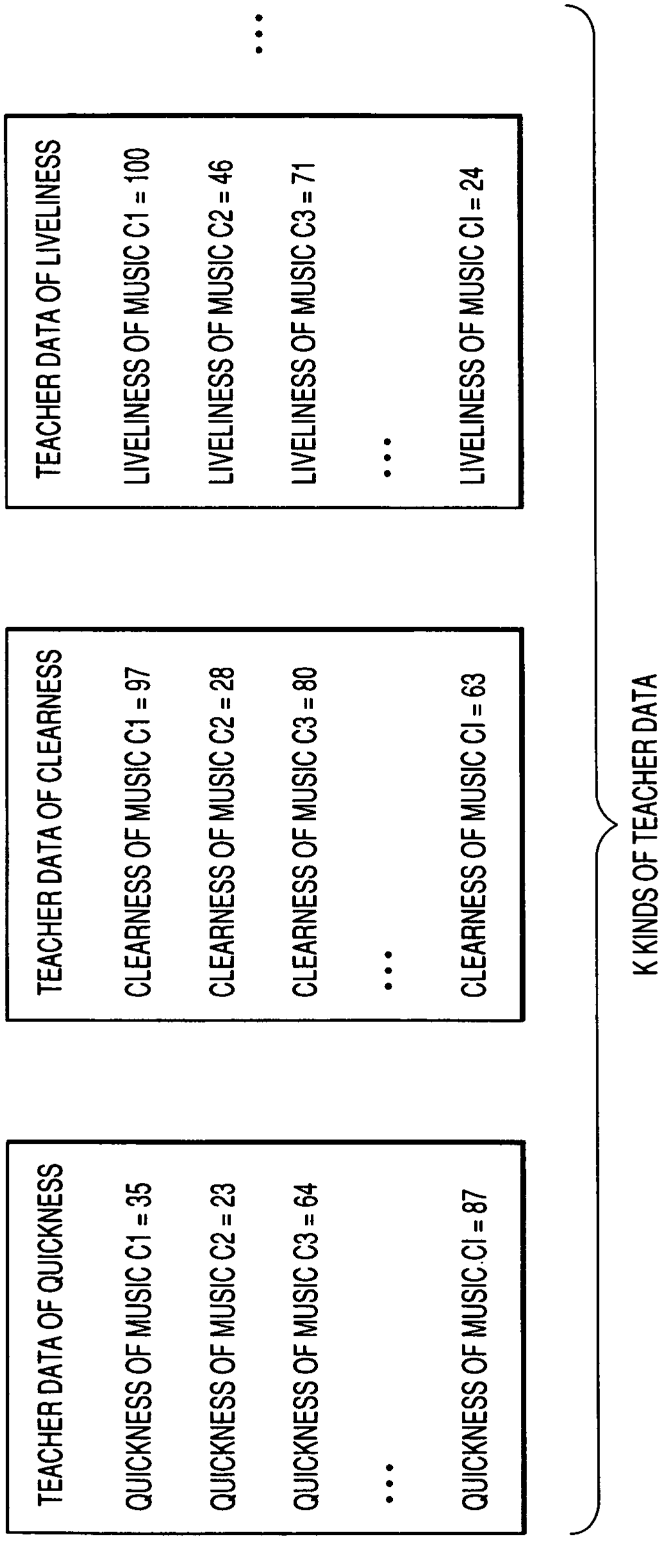
FIG. 23 is a view showing an example of teacher data.

Return is made to FIG. 7. At step S4, the high-level feature quantity extraction expression learning section 25 estimates (creates), by learning, n sets each including k kinds of high-level feature quantity extraction expressions based on the n sets of low-level feature quantities respectively calculated correspondingly to the respective input data inputted from the low-level feature quantity arithmetic section 24 and the corresponding teacher data (as shown in FIG. 23, k-kinds of high-level feature quantities corresponding to the respective input data (music pieces C1 to Cl)). Besides, the estimated precision of each high-level feature quantity extraction expression and the contribution ratio of each low-level feature quantity in each high-level feature quantity extraction expression are calculated, and are outputted to the low-level feature quantity extraction expression list creation section 21.

Figure 24:
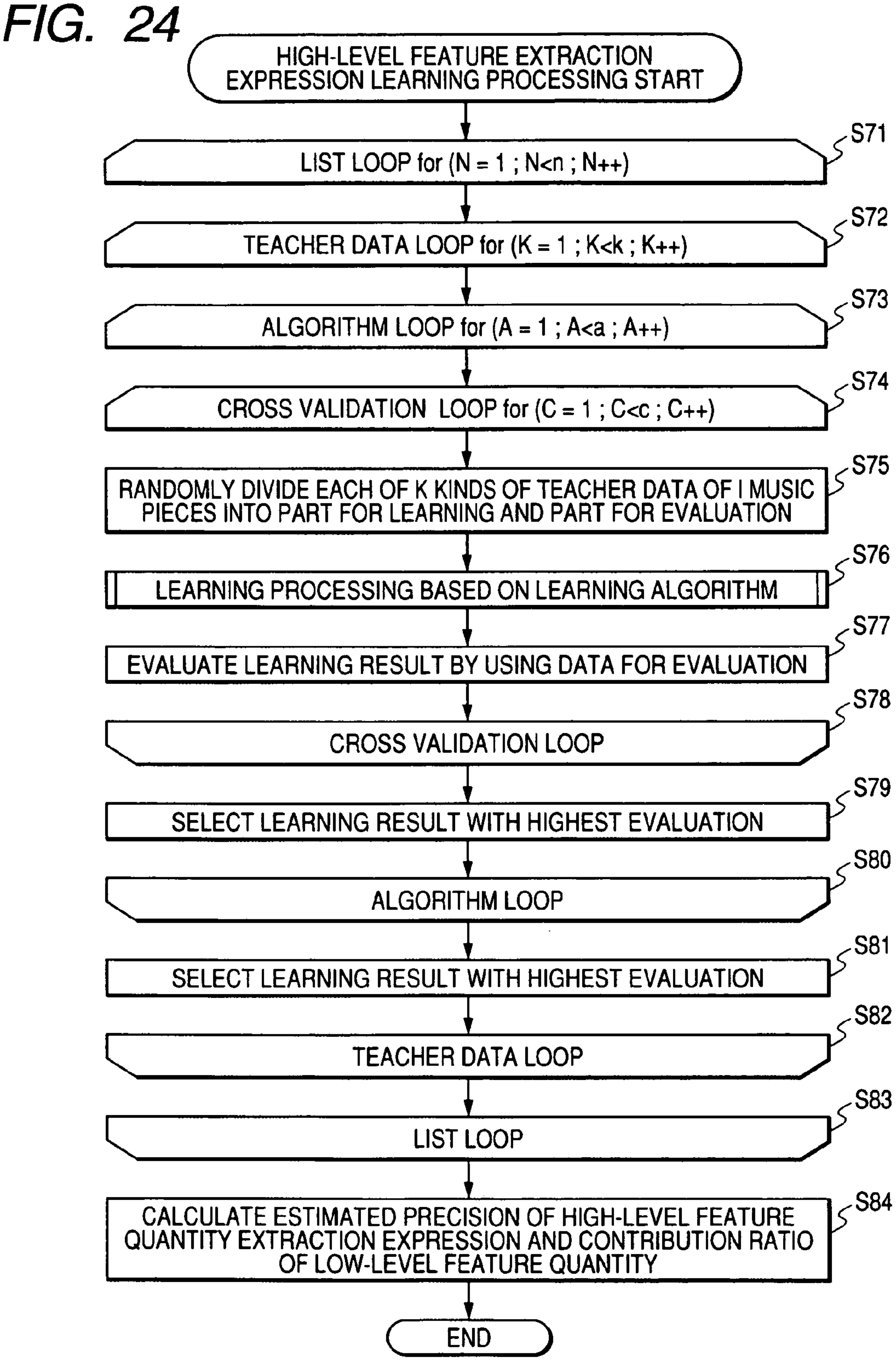
FIG. 24 is a flowchart for explaining a high-level feature quantity extraction expression learning processing.

The high-level feature quantity extraction expression learning processing at step S4 will be described in detail with reference to a flowchart of FIG. 24.

At step S71, the control section 27 initializes a list loop parameter N to 1 and starts a list loop. Incidentally, the list loop is repeated by a previously set list number n. At step S72, the control section 27 initializes a teacher data loop parameter K to 1 and starts a teacher data loop. Incidentally, the teacher data loop is repeated by the kind number k of teacher data previously set.

At step S73, the control section 27 initializes an algorithm loop parameter A to 1 and starts an algorithm loop. Incidentally, the algorithm loop is repeated by the kind number "a" of learning algorithm.

As the applied learning algorithm, for example, Regression (regression analysis), Classify (class separation), SVM (Support Vector Machine) and GP (Genetic Programming) can be named.

Figure 25:
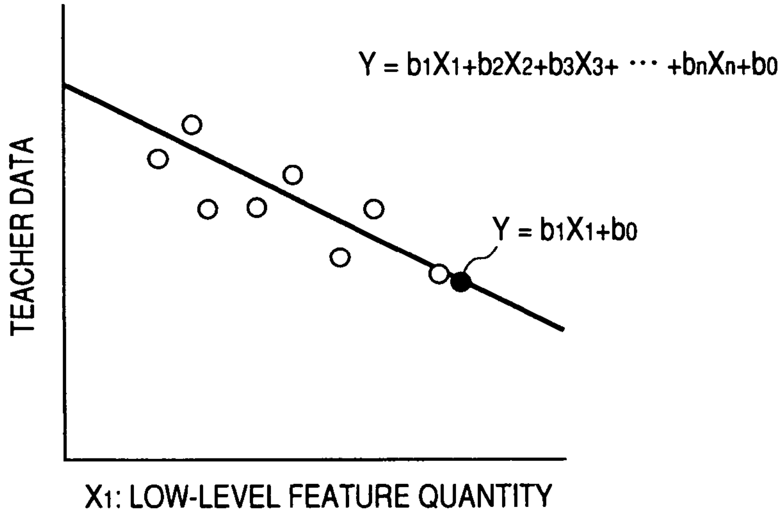
FIG. 25 is a view for explaining an example of a learning algorithm.
Figure 26:
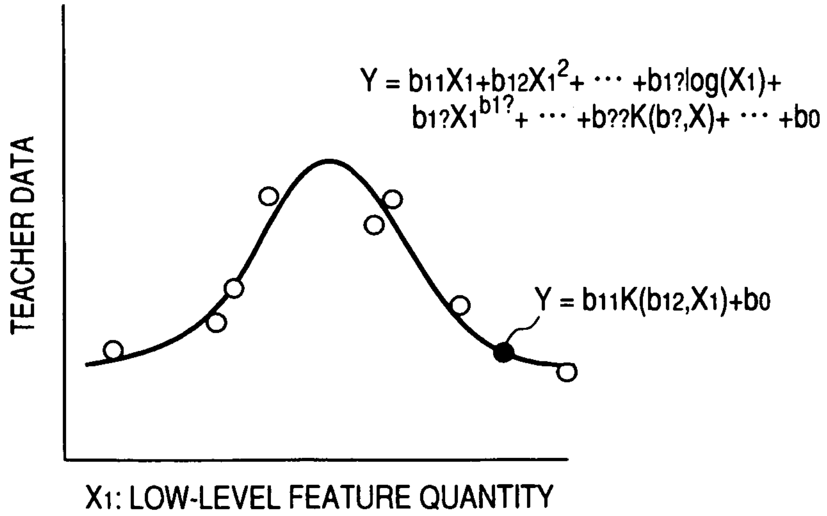
FIG. 26 is a view for explaining an example of a learning algorithm.

As the learning algorithm belonging to the Regression, there are one in which as shown in FIG. 25, on the assumption that the teacher data and the low-level feature quantity are in a linear relation, a parameter $b_n$ is learned so that the square error between the teacher data and Y becomes minimum, and one in which as shown in FIG. 26, on the assumption that the teacher data and the low-level feature quantity are in a non-linear relation, a parameter $b_{nm}$ is learned so that the square error between the teacher data and Y becomes minimum.

Figure 30A:
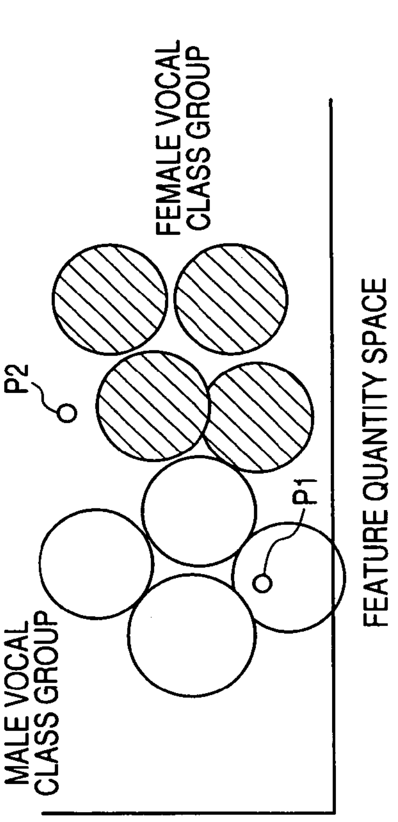
FIGS. 30A and 30B are views for explaining an example of a learning algorithm.
Figure 30B:
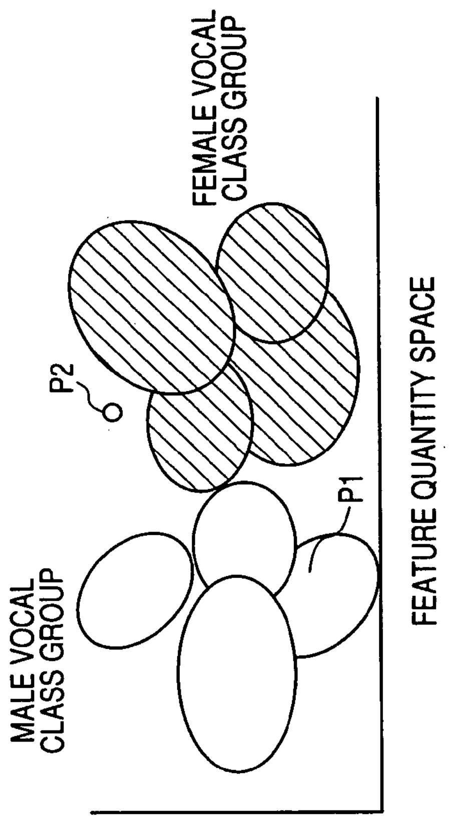

As the learning algorithm belonging to the Classify, there are one in which as shown in FIG. 27, a Euclid distance d from the center of each of classes (in the case of the figure, a male vocal class and a female vocal class) is calculated, and classification is made into the class where the Euclid distance d is shortest, one in which as shown in FIG. 28, a correlation "correl" to a mean vector of each of classes (in the case of the figure, a male vocal class and a female vocal class) is calculated, and classification is made into the class where the correlation "correl" is maximum, one in which as shown in FIG. 29, a Mahalanobis distance d from the center of each of classes (in the case of the figure, a male vocal class and a femalevocal class) is calculated, and classification is made into the class where the Mahalanobis distance d is shortest, one in which as shown in FIG. 30A, a distribution of each of class groups (in the case of the figure, a male vocal class group and a female vocal class group) is represented by plural classes, a Euclid distance d from the center of each of the class groups is calculated and classification is made into the class where the Euclid distance d is shortest, and one in which as shown in FIG. 30B, a distribution of each of class groups (in the case of the figure, a male vocal class group and a female vocal class group) is represented by plural classes, a Mahalanobis distance d from the center of each of the class groups is calculated and classification is made into the class where the Mahalanobis distance d is shortest.

As the learning algorithm belonging to the SVM, there is one in which as shown in FIG. 31, a boundary plane of each of classes (in the case of the figure, a male vocal class and a female vocal class) is represented by a support vector, and a parameter bnm is learned so that a distance (margin) between a separation surface and a vector near the boundary becomes maximum.

Figures 33A, 33B:
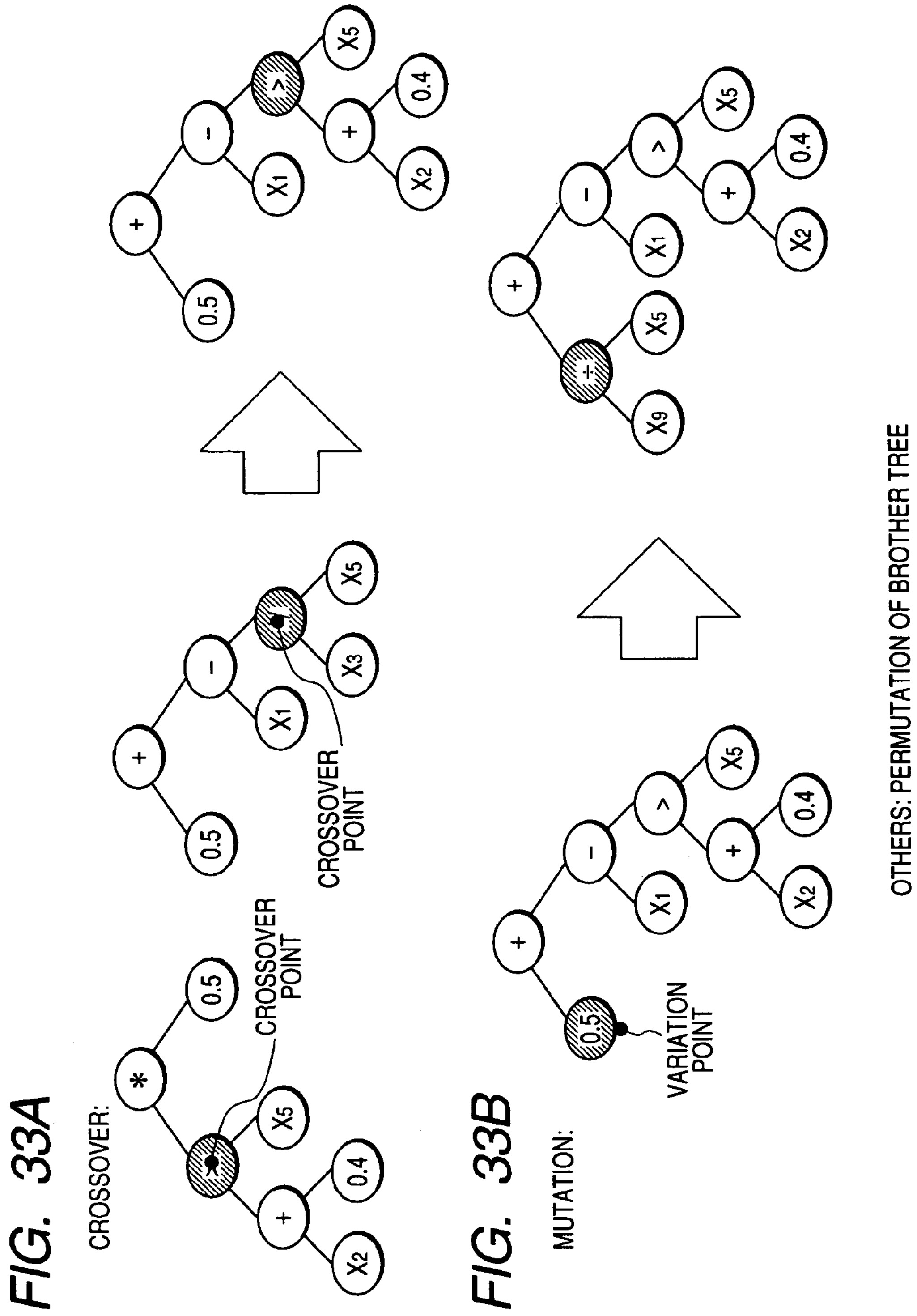
FIGS. 33A and 33B are views for explaining an example of a learning algorithm.

As the learning algorithm belonging to the GP, there are one in which as shown in FIG. 32, an expression including a combination of low-level feature quantities is created by the GP, one in which as shown in FIG. 33A, expressions each including a combination of low-level feature quantities are crossed, and one in which as shown in FIG. 33B, an expression including a combination of low-level feature quantities is mutated.

For example, in the case where all the learning algorithms are used, the kind number "a" of the learning algorithms is 11.

Return is made to FIG. 24. At step S74, the control section 27 initializes a cross validation loop parameter C to 1 and starts a cross validation loop. Incidentally, the cross validation loop is repeated by a previously set cross validation number c.

At step S75, the high-level feature quantity extraction expression learning section 25 divides a K-th kind of teacher data (high-level feature quantity) of one music piece among k kinds of teacher data at random into two parts for learning and for evaluation (cross validation). Hereinafter, in the teacher data, the part classified as one for learning is called data for learning, and the part classified as one for evaluation is called data for evaluation.

At step S76, the high-level feature quantity extraction expression learning section 25 applies m kinds of low-level feature quantities calculated by using the N-th low-level feature quantity extraction expression list and the data for learning to an a-th learning algorithm, and estimates the high-level feature quantity extraction expression by learning. At this learning, in order to reduce the amount of arithmetic operation and to suppress over-learning (over-fitting), some of the m kinds of low-level feature quantities are genetically selected and are used.

As an evaluation value at a time when the low-level feature quantity is selected, the information amount criterion AIC (Akaike Information Criterion) as a function, or the information amount criterion BIC (Bayesian Information Criterion) is used. The information amount criterion AIC or BIC is used as the selection criterion of a learning model (in this case, the selected low-level feature quantity), and as the value becomes small, the learning model is excellent (evaluation is high).

The AIC is expressed by a following expression.

AIC=−2×maximum logarithmic likelihood+2×free parameter number

For example, in the case where the Regression (linear) is adopted for the learning algorithm (in the case of FIG. 25), since the free parameter number=n+1, and the logarithmic likelihood=−0.5×number of data for learning ((log 2n)+1+log(mean square error)) are established, AIC=number of data for learning×((log 2 n)+1+log(mean square error))+2×(n+1).

BIC is expressed by a following expression.

BIC=−2×maximum logarithmic likelihood+log(number of data for learning)×free parameter number.

For example, in the case where the Regression (linear) is adopted as the learning algorithm (case of FIG. 25), BIC=number of data for learning×((log 2 n)+1+log(mean square error))+log(number of data for learning)×(n+1). As compared with the AIC, the BIC has a feature that even if the number of data for learning is increased, the value is hard to increase.

Figure 34:
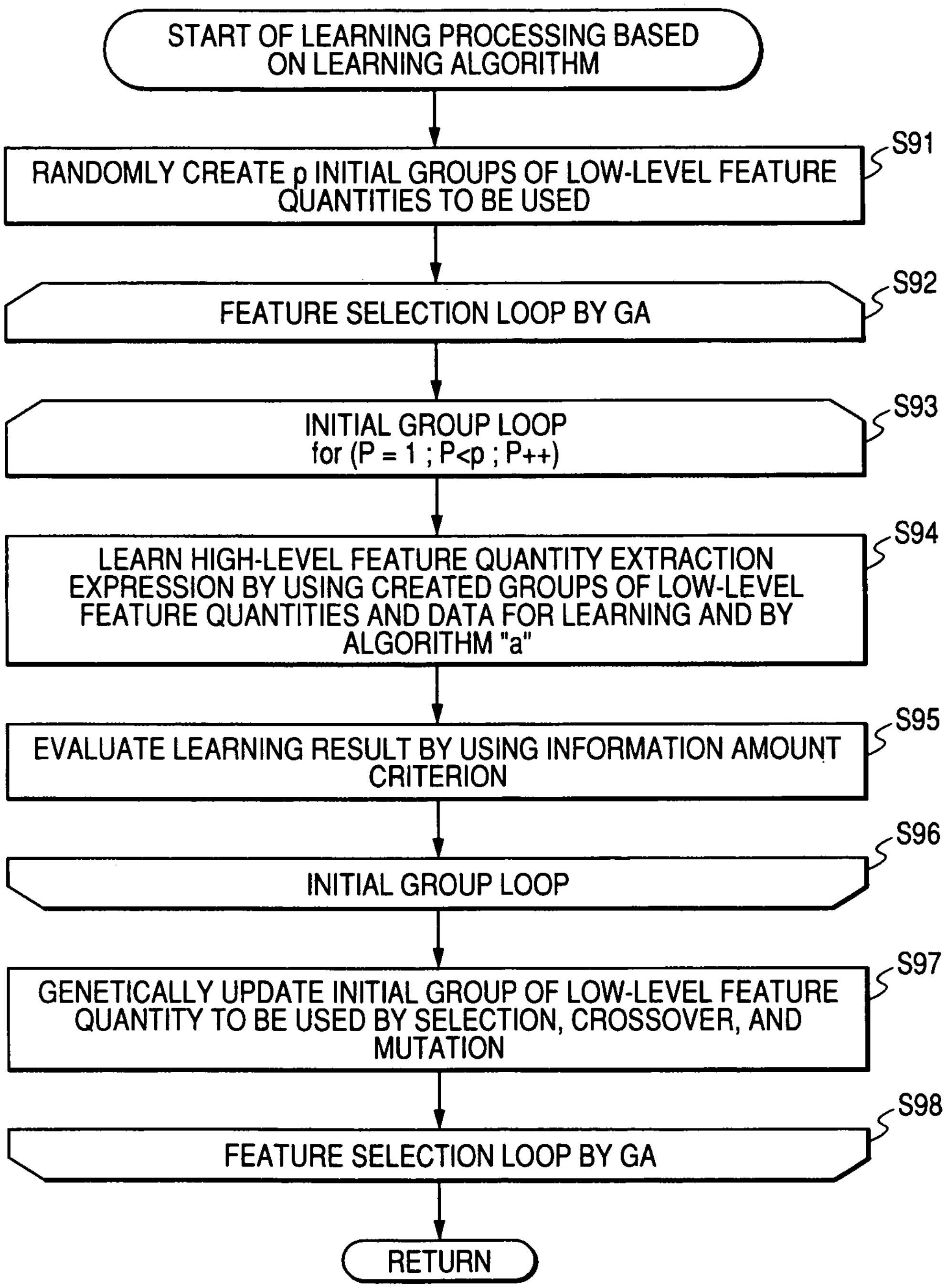
FIG. 34 is a flowchart for explaining a learning processing based on a learning algorithm.

Here, a learning processing based on the learning algorithm of step S76 will be described with reference to FIG. 34. At this learning processing, as described above, in order to reduce the amount of arithmetic operation and to suppress the over-learning (over-fitting), some of the m kinds of low-level feature quantities are genetically selected and are used.

At step S91, the high-level feature quantity extraction expression learning section 25 creates p sets of initial groups in each of which among m kinds of low-level feature quantities, ones to be selected (ones used for learning) are extracted at random.

At step S92, the high-level feature quantity extraction expression learning section 25 starts a feature selection loop by a genetic algorithm (GA: genetic algorithm). The feature selection loop by the GA is repeated until a specified condition is satisfied at step S98 described later.

At step S93, the control section 27 initializes an initial group loop parameter P to 1 and starts an initial group loop. Incidentally, the initial group loop is repeated by the initial group number p of low-level feature quantities created in the processing of step S91.

At step S94, the high-level feature quantity extraction expression learning section 25 uses the low-level feature quantity included in the P-th initial group and data for learning among the teacher data, applies them to the a-th learning algorithm, and estimates the high-level feature quantity extraction expression by learning.

At step S95, the high-level feature quantity extraction expression learning section 25 calculates the information amount criterion AIC or BIC as the evaluation value of the high-level feature quantity obtained as the processing result of step S94. At step S96, the control section 27 judges whether or not the initial group loop parameter P is smaller than the maximum value p, and in the case where the initial group loop parameter P is smaller than the maximum value p, the initial group loop parameter P is incremented by 1 and the processing is returned to step S94. On the other hand, in the case where the initial group loop parameter P is not smaller than the maximum value p (in the case where the initial group loop parameter P is equal to the maximum value p), the processing exits from the initial group loop and proceeds to step S97. By this initial group loop, the information criterion amount can be obtained as the evaluation value of the high-level feature quantity extraction expression learned on the basis of each initial group.

At step S97, the high-level feature quantity extraction expression learning section 25 genetically updates the p sets of initial groups including the low-level feature quantities used for learning based on the evaluation value (information amount criterion). Specifically, similarly to steps S32 to S34 of FIG. 17, the initial group is updated by selection, crossover and mutation. By this update, the initial group first created at random becomes one in which the learning to improve the evaluation value of the high-level feature quantity extraction expression is advanced.

At step S98, the control section 27 returns the processing to step S93 as long as, among the high-level feature quantity extraction expressions corresponding to the p sets of initial groups, the evaluation value of one with the highest evaluation value (information criterion amount is small) is improved (information criterion amount is decreased) each time the feature selection loop by the GA is repeated. On the other hand, in the case where among the high-level feature quantity extraction expressions corresponding to the p sets of initial groups, the evaluation value of one with the highest evaluation value is not improved even if the feature selection loop by the GA is repeated (information criterion amount is not decreased), the processing exits from the feature selection loop by the GA, and the high-level feature quantity extraction expression with the highest evaluation value is outputted to the latter stage processing (processing of step S77 of FIG. 24). The learning processing based on the learning algorithm is ended.

Return is made to FIG. 24. At step S77, the high-level feature quantity extraction expression learning section 25 evaluates the high-level feature quantity extraction expression obtained in the processing of step S76 by using the data for evaluation. Specifically, the high-level feature quantity is calculated by using the obtained high-level feature quantity extraction expression, and the square error to the data for evaluation is calculated.

At step S78, the control section 27 judges whether or not the cross validation loop parameter C is smaller than the maximum value c, and in the case where the cross validation loop parameter C is smaller than the maximum value c, the cross validation loop parameter C is incremented by 1 and the processing is returned to step S75. On the other hand, in the case where the cross validation loop parameter C is not smaller than the maximum value c (in the case where the cross validation loop parameter C is equal to the maximum value c), the processing exits from the cross validation loop and proceeds to step S79. By the processing up to this point, c learning results, that is, high-level feature quantity extraction expressions are obtained. Since the data for learning and the data for evaluation are converted at random by this cross validation loop, it is possible to confirm that the high-level feature quantity extraction expression is not over-learned.

At step S79, the high-level feature quantity extraction expression learning section 25 selects, among the c learning results obtained by the cross validation loop, that is, the high-level feature quantity extraction expressions, one with the highest evaluation value in the processing of step S77.

At step S80, the control section 27 judges whether or not the algorithm loop parameter A is smaller than the maximum value "a", and in the case where the algorithm loop parameter A is smaller than the maximum value "a", the algorithm loop parameter A is incremented by 1 and the processing is returned to step S74. On the other hand, in the case where the algorithm loop parameter A is not smaller than the maximum value "a" (in the case where the algorithm loop parameter A is equal to the maximum value "a"), the processing exits from the algorithm loop and proceeds to step S81. By this algorithm loop, "a" Kth kind high-level feature quantity extraction expressions learned by the A kinds of learning algorithms are obtained. Then, at step S81, the high-level feature quantity extraction expression learning section 25 selects, among the "a" learning results obtained by the algorithm loop, that is, the high-level feature quantity extraction expressions, one with the highest evaluation value in the processing of step S77.

At step S82, the control section 27 judges whether or not the teacher data loop parameter K is smaller than the maximum value k, and in the case where the teacher data loop parameter K is smaller than the maximum value k, the teacher data loop parameter K is incremented by 1 and the processing is returned to step S73. On the other hand, in the case where the teacher data loop parameter K is not smaller than the maximum value k (in the case where the teacher data group parameter K is equal to the maximum value k), the processing exits from the teacher data loop and proceeds to step S83. By this teacher data loop, k kinds of high-level feature quantity extraction expressions corresponding to the N-th low-level feature quantity extraction expression list are obtained.

At step S83, the control section 27 judges whether or not the list loop parameter N is smaller than the maximum value n, and in the case where the list loop parameter N is smaller than the maximum value n, the list loop parameter N is incremented by 1 and the processing is returned to step S72. On the other hand, in the case where the list loop parameter N is not smaller than the maximum value n (in the case where the list loop parameter N is equal to the maximum value n), the processing exits from the list loop and proceeds to step S84. By this list loop, k kinds of high-level feature quantity extraction expressions corresponding to each of the n low-level feature quantity extraction expression lists are obtained.

At step S84, the high-level feature quantity extraction expression learning section 25 calculates the estimated precision of the k kinds of high-level feature quantity extraction expressions corresponding to each of the n obtained low-level feature quantity extraction expression lists and the contribution ratio of each low-level feature quantity in each high-level feature quantity extraction expression, and outputs them to the low-level feature quantity extraction expression list creation section 21. Here, the high-level feature quantity extraction expression learning processing is ended.

Return is made to FIG. 7. At step S5, the control section 27 judges whether or not the learning loop parameter G is smaller than the maximum value g, and in the case where the learning loop parameter G is smaller than the maximum value g, the learning loop parameter G is incremented by 1 and the processing is returned to step S2. On the other hand, in the case where the learning loop parameter G is not smaller than the maximum value g (in the case where the learning loop parameter G is equal to the maximum value g), the processing exits from the learning loop and proceeds to step S6. Incidentally, the learning rules of steps S1 to S5 are the learning process of the feature quantity extraction algorithm, and step S6 subsequent thereto is the processing for the arithmetic operation of the high-level feature quantity using the feature quantity extraction algorithm.

At step S6, the high-level feature quantity extraction expression learning section 25 supplies, at the final generation of learning, among the n sets of low-level feature quantity extraction expression lists, m sets of low-level feature quantity extraction expressions of the list with the highest mean precision of the obtained high-level feature quantities, and k kinds of high-level feature quantity extraction expressions corresponding thereto to the high-level feature quantity arithmetic section 26. At step S7, the high-level feature quantity arithmetic section 26 uses, among the low-level feature quantity extraction expressions supplied from the high-level feature quantity extraction expression learning section 25 and the high-level feature quantity extraction expressions, the low-level feature quantity extraction expression finally supplied from the high-level feature quantity extraction expression learning section 25 and the high-level feature quantity extraction expression and calculates the high-level feature quantity. Incidentally, the processing of step S7 will be described later with reference to FIG. 38 and the following figures.

Here, the description of the feature quantity extraction algorithm creation processing by the feature quantity extraction algorithm creation apparatus 20 is ended.

Next, a new operator creation processing will be described which is executed when the learning loop of steps S1 to S6 in the feature quantity extraction algorithm creation processing is repeated and the generation of the low-level feature quantity extraction expression list proceeds and grows, that is, the attribute degree of the low-level feature quantity extraction expression is improved, or the estimated precision of the corresponding high-level feature quantity extraction expression is improved.

In the case where the generation of the low-level feature quantity extraction expression list proceeds and grows, in the low-level feature quantity extraction expression list, as shown in FIG. 35, a permutation of plural operators (hereinafter referred to as a combination of operators) frequently appears on different low-level feature quantity extraction expressions. Then, a combination of plural operators frequently appearing on different low-level feature quantity extraction expressions is made one of new operators, and is registered as an operator to be used in the low-level feature quantity extraction expression list creation section 21.

For example, in the case of FIG. 35, the combination of three operators "32#FFT, Log, 32#FFT" appears in five low-level feature quantity extraction expressions. In the case where "32#FFT, Log, 32#FFT" are registered as one operator NewOperator1, for example, as shown in FIG. 36, the operator NewOperator1 is included in the next and subsequent generation of the low-level feature quantity extraction expressions.

This new operator creation processing will be described with reference to a flowchart of FIG. 37. At step S101, the operator set detection section 22 creates an operator permutation (combination of ordered operators) including a specified number (for example, 1 to 5) operators or less. The number of combinations of operators created here is made og.

At step S102, the control section 27 initializes a combination loop parameter OG to 1 and starts a combination loop. Incidentally, the combination loop is repeated by the combination number og of operators.

At step S103, the appearance frequency Count of the og-th combination of operators is initialized to 1. At step S104, the control section 27 initializes a list loop parameter N to 0 and starts a list loop. Incidentally, the list loop is repeated by a previously set list number n. At step S105, the control section 27 initializes an expression loop parameter M to 1 and starts an expression loop. Incidentally, the expression loop is repeated by the number m of low-level feature quantity extraction expressions constituting one low-level feature quantity extraction expression list.

At step S106, the operator set detection section 22 judges whether or not the og-th combination of operators exists on the M-th low-level feature quantity extraction expression constituting the N-th low-level feature quantity extraction expression list, and in the case where a judgment is made that it exists, the processing proceeds to step S107, and the appearance frequency Count is incremented by 1. On the other hand, in the case where a judgment is made that the og-th combination of operators does not exist, step S107 is skipped, and the processing proceeds to step S108.

At step S108, the control section 27 judges whether or not the expression loop parameter M is smaller than the maximum value m, and in the case where the expression loop parameter M is smaller than the maximum value m, the expression loop parameter M is incremented by 1, and the processing is returned to step S106. On the other hand, in the case where the expression loop parameter M is not smaller than the maximum value m (in the case where the expression loop parameter M is equal to the maximum value m), the processing exits from the expression loop and proceeds to step S109.

At step S109, the control section 27 judges whether or not the list parameter N is smaller than the maximum value n, and in the case where the list loop parameter N is smaller than the maximum value n, the list loop parameter N is incremented by 1, and the processing is returned to step S105. On the other hand, in the case where the list loop parameter N is not smaller than the maximum value n (in the case where the list loop parameter N is equal to the maximum value n), the processing exits from the list loop and proceeds to step S110.

At step S110, the control section 27 judges whether or not the combined loop parameter OG is smaller than the maximum value og, and in the case where the combined loop parameter OG is smaller than the maximum value og, the combined loop parameter OG is incremented by 1 and the processing is returned to step S103. On the other hand, in the case where the combined loop parameter OG is not smaller than the maximum value og (in the case where the combined loop parameter OG is equal to the maximum value og), the processing exits from the combined loop and proceeds to step S110. By the processing up to this point, the appearance frequency Count corresponding to each of the combinations of all operators is detected.

At step S111, the operator set detection section 22 extracts the combination of operators the appearance frequency Count of which is a specified threshold or higher, and outputs it to the operator creation section 23. At step S112, the operator creation section 23 registers the combination of the operators inputted from the operator set detection section 22 as one new operator. Here, the new operator creation processing is ended.

As described above, according to the new operator creation processing, the combination of operators the appearance frequency of which is high, that is, which is considered to be effective for the arithmetic operation of the high-level feature quantity, is made one operator, and is used in the next and subsequent generation of low-level feature quantity extraction expressions, and therefore, the creation speed and the growth speed of the low-level feature quantity extraction expressions are improved. Besides, the effective low-level feature quantity extraction expression is found early. Further, since the combination of operators considered to be effective, which has been found manually in related art, can be automatically detected, this point is also one of effects of the new operator creation processing.

Figure 38:
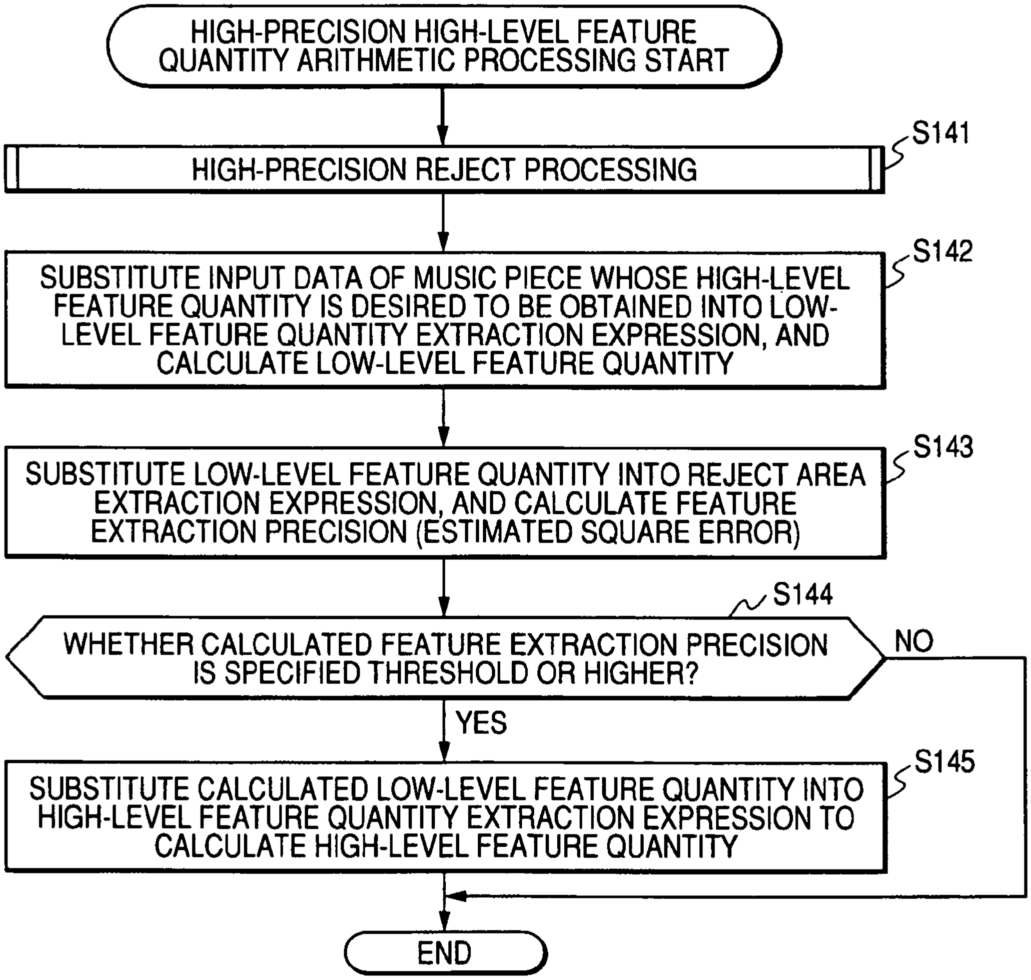
FIG. 38 is a flowchart for explaining a high-precision high-level feature quantity arithmetic processing.

Next, the processing of step S7 of FIG. 7 will be described with reference to a flowchart of FIG. 38. At step S141, the high-level feature quantity arithmetic section 26 executes a high-precision reject processing to select, among final high-level feature quantity extraction expressions supplied from the high-level feature quantity extraction expression learning section 25, only those in which high-precision arithmetic results can be obtained.

Figure 39:
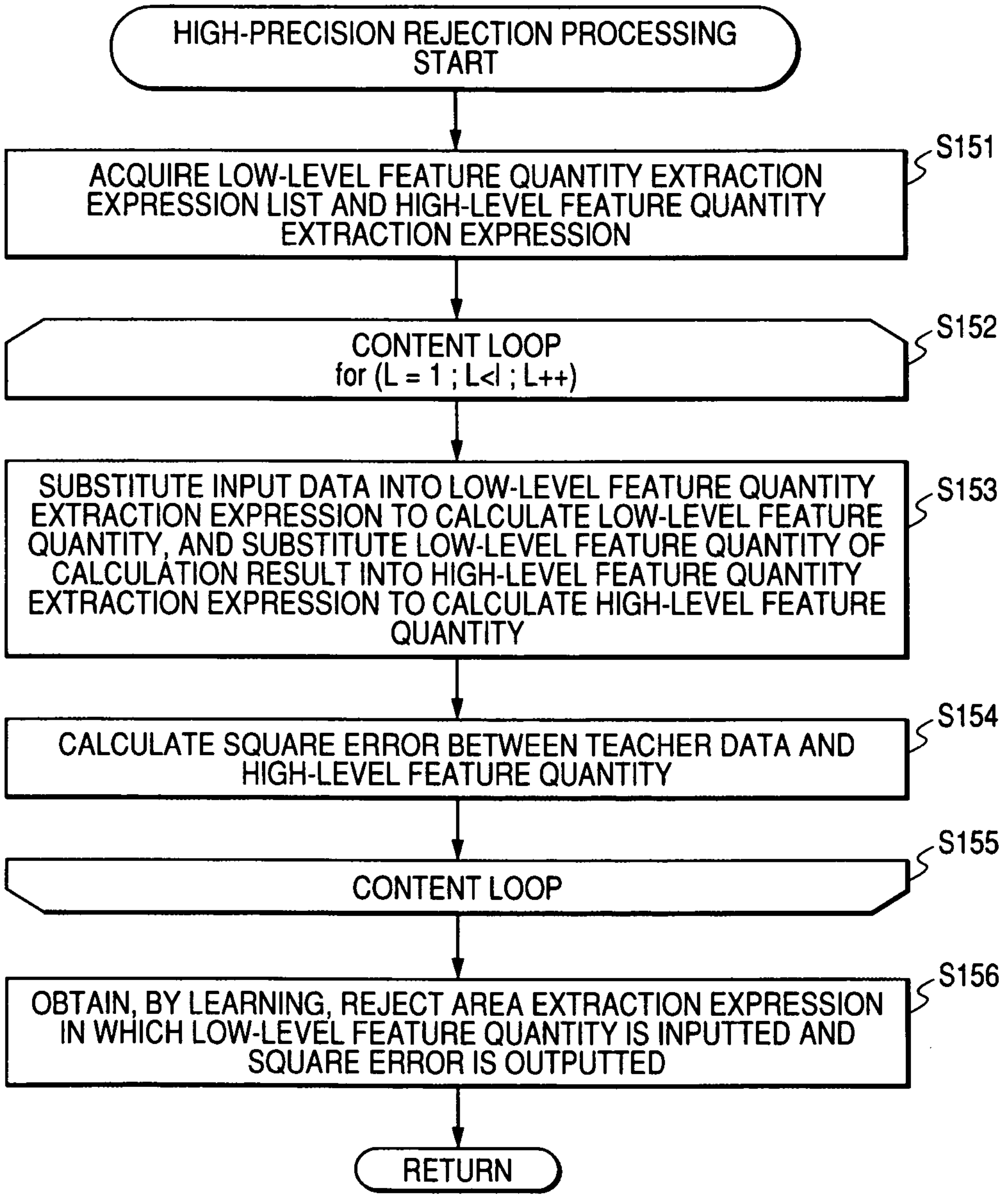
FIG. 39 is a flowchart for explaining a high-precision reject processing.
Figure 40:
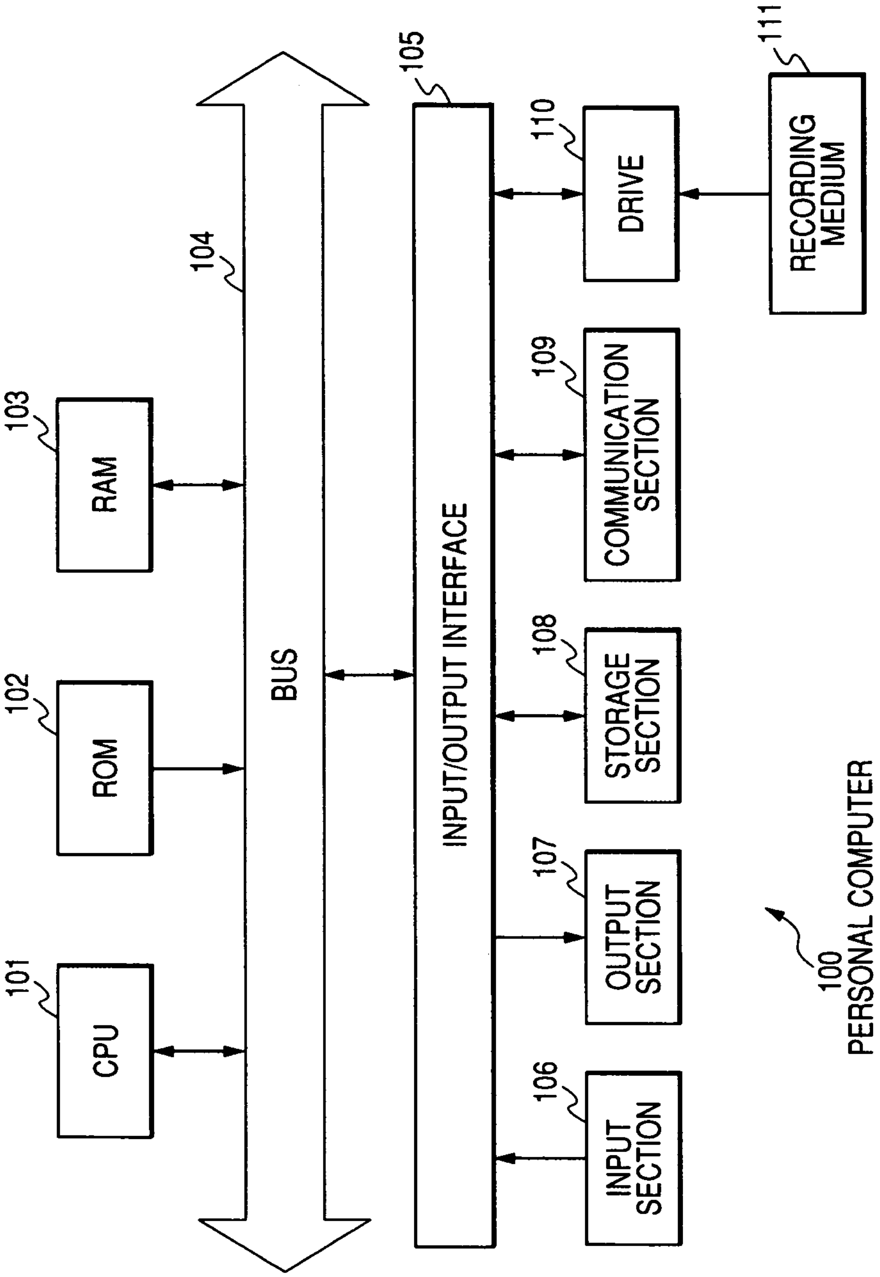
FIG. 40 is a block diagram showing a structural example of a general-purpose personal computer.

The high-precision reject processing is such that based on an idea that the precision of a high-level feature quantity relates to the value of a low-level feature quantity, a reject area extraction expression in which a low-level feature quantity is inputted and the precision of a high-level feature quantity is outputted is obtained by learning. The high-precision reject processing will be described with reference to a flowchart of FIG. 39.

At step S151, the low-level feature quantity arithmetic section 41 of the high-level feature quantity arithmetic section 26 acquires the final low-level feature quantity extraction expression list. The high-level feature quantity arithmetic section 42 of the high-level feature quantity arithmetic section 26 acquires the final high-level feature quantity extraction expression.

At step S152, the control section 27 initializes a content loop parameter L to 1 and starts a content loop. Incidentally, the content loop is repeated by the number 1 of input data (content data and metadata) prepared for the execution of the high-precision reject processing. Incidentally, it is assumed that the high-level feature quantity corresponding to the prepared input data is also prepared as teacher data.

At step S153, the low-level feature quantity arithmetic section 41 substitutes the L-th input data into the final low-level feature quantity extraction expression list acquired in the processing of step S151, and outputs m kinds of low-level feature quantities as the arithmetic result to the high-level feature quantity arithmetic section 42 and the reject area extraction expression learning section 44. The high-level feature quantity arithmetic section 42 substitutes the m kinds of low-level feature quantities inputted from the low-level feature quantity arithmetic section 41 into the final high-level feature quantity extraction expression acquired in the processing of step S151, and outputs the high-level feature quantity as the arithmetic result to the square error arithmetic section 43.

At step S154, the square error arithmetic section 43 calculates the square error between the high-level feature quantity inputted from the high-level feature quantity arithmetic section 42 and the teacher data (true high-level feature quantity corresponding to the input data), and outputs it to the reject area extraction expression learning section 44. The square error of this arithmetic result becomes the precision (hereinafter referred to as feature extraction precision) of the high-level feature quantity extraction expression to be calculated in the high-level feature quantity arithmetic section 42.

At step S155, the control section 27 judges whether or not the content loop parameter L is smaller than the maximum value 1, and in the case where the content loop parameter L is smaller than the maximum value 1, the content loop parameter L is incremented by 1, and the processing is returned to step S153. On the other hand, in the case where the content loop parameter L is not smaller than the maximum value 1 (in the case where the content loop parameter L is equal to the maximum value 1), the processing exits from the content loop and proceeds to step S156. By the processing up to this point, the square error between the high-level feature quantity and the teacher data, obtained by the arithmetic operation, corresponding to each of the input data, is obtained.

At step S156, by the learning based on the low-level feature quantity inputted from the low-level feature quantity arithmetic section 41 and the square error inputted from the square error arithmetic section 43, the reject area extraction expression learning section 44 creates the reject area extraction expression in which the low-level feature quantity is inputted and the feature extraction precision of the high-level feature quantity calculated based thereon is outputted, and supplies the created reject area extraction expression to the feature quantity extraction precision arithmetic section 45. Here, the high-precision reject processing is ended, and the processing is advanced to step S142 of FIG. 38.

At step S142, with respect to the input data of a music piece whose high-level feature quantity is desired to be obtained, the low-level feature quantity arithmetic section 41 substitutes the L-th input data into the final low-level feature quantity extraction expression list, calculates the low-level feature quantity, and outputs the arithmetic result to the high-level feature quantity arithmetic section 42 and the feature quantity extraction precision arithmetic section 45.

At step S143, the feature quantity extraction precision arithmetic section 45 substitutes the low-level feature quantity inputted from the low-level feature quantity arithmetic section 41 into the reject area extraction expression supplied from the reject area extraction expression learning section 44, and calculates the feature quantity extraction precision of the high-level feature quantity calculated based on the low-level feature quantity inputted from the low-level feature quantity arithmetic section 41 (that is, the square error estimated with respect to the high-level feature quantity calculated by the high-level feature quantity arithmetic section 42).

At step S144, the feature quantity extraction precision arithmetic section 45 judges whether or not the feature quantity extraction precision calculated in the processing of step S143 is a specified threshold or higher, and in the case where it is judged that the calculated feature quantity extraction precision is the specified threshold or higher, the processing proceeds to step S145, and the feature quantity extraction precision arithmetic section 45 causes the high-level feature quantity arithmetic section 42 to calculate the high-level feature quantity. The high-level feature quantity arithmetic section 42 substitutes the m kinds of low-level feature quantities inputted from the low-level feature quantity arithmetic section 41 in the processing of step S142 into the final high-level feature quantity extraction expression, and calculates the high-level feature quantity. The high-level feature quantity calculated here is outputted, and the high-precision high-level feature quantity arithmetic processing is ended.

Incidentally, at step S144, in the case where it is judged that the calculated feature quantity extraction precision is smaller than the specified threshold, step S145 is skipped, and the high-precision high-level feature quantity arithmetic processing is ended.

Accordingly, according to the high-precision high-level feature quantity arithmetic processing, the precision of the high-level feature quantity calculated through the high-level feature quantity extraction expression can be estimated. Besides, since the high-level feature quantity in which the high precision can not be expected is not calculated, it becomes possible to omit a wasteful arithmetic operation.

As described above, according to the feature quantity extraction algorithm learning processing by the feature quantity extraction algorithm creation apparatus 20 to which the invention is applied, the algorithm capable of extracting the corresponding feature quantity from the music piece data can be created at high precision and quickly, and further, only the high-precision high-level feature quantity can be acquired with a small amount of arithmetic operation.

Incidentally, the invention can be applied not only to a case where a high-level feature quantity of a music piece is acquired, but also to a case where a high-level feature quantity of any kind of content data such as video data is acquired.

Although the foregoing series of processings can be executed by hardware, they can also be executed by software. In the case where the series of processings are executed by the software, a program configuring the software is installed from a recording medium into a computer incorporated in dedicated hardware, or for example, a general-purpose personal computer on which various programs are installed so that various functions can be executed.

This personal computer 100 includes a CPU (Central Processing Unit) 101. The CPU 101 is connected with an input/output interface 105 through a bus 104. The bus 104 is connected with a ROM (Read Only Memory) 102 and a RAM (Random Access Memory) 103.

The input/output interface 105 is connected with an input section 106 including an input device, such as a keyboard or a mouse, by which the user inputs an operation command, an output section 107 including a display, such as a CRT (Cathode Ray Tube) or LCD (Liquid Crystal Display), to display an operation screen and the like, a storage section 108 including a hard disk drive or the like to store programs and various data, and a communication section 109 which includes a modem, a LAN (Local Area Network) adapter or the like and executes communication processing through a network typified by the Internet. Besides, a drive 110 is connected which writes/reads data to/from a recording medium 111 such as a magnetic disk (including a flexible disk), an optical disk (including CD-ROM (Compact Disc-Read Only Memory) and DVD (Digital Versatile Disc)), a magneto-optical disc (including MD (Mini Disc)), or a semiconductor memory.

The program to cause the personal computer 100 to execute the series of processings is stored in the recording medium 111 and is supplied to the personal computer 100, is read by the drive 110, and is installed on the hard disk drive incorporated in the storage section 108. The program installed on the storage section 108 is loaded therefrom to the RAM 103 and is executed by the instruction of the CPU 101 corresponding to the command from the user inputted to the input section 106.

Incidentally, in the specification, the steps executed based on the program naturally include the processings performed in time series in accordance with the recited sequence, and further include processings which are not necessarily performed in time series but are performed in parallel or individually.

Besides, the program may be processed by one computer or may be subjected to distributed processing by plural computers. Further, the program may be transferred to a remote computer and executed.

Besides, in the specification, the system indicates the whole apparatus including plural devices.

Incidentally, the embodiments of the invention are not limited to the foregoing embodiments, but can be variously modified in the scope not departing from the gist of the invention.

What is claimed is:

1. An information processing apparatus, comprising:
a memory device storing program code; and
a processor executing the program code to perform:
- extracting a common operator permutation existing in a plurality of arithmetic expressions, the common operator permutation comprising a plurality of operators;
- registering the extracted common operator permutation as a new operator after the extraction;
- creating a first new expression using the new operator;
- calculating a contribution ratio of the new operator to the first new expression;
- comparing the contribution ratio with a pre-determined value;
- re-using the new operator for a second new expression if the contribution ratio is higher than or equal to the pre-determined value; and
- modifying the new operator if the contribution ratio is lower than the pre-determined value.

2. The information processing apparatus according to claim 1, wherein the common operator permutation comprises at least one of a processing symmetry axis or a parameter.

3. The information processing apparatus according to claim 1, wherein the processor further executing the program code to perform:
- creating a plurality of operator permutations, each of the created operator permutations including a specified number of operators, and
- identifying one of the created permutations, which has a high appearance frequency in the plurality of the arithmetic expressions, as the common operator permutation.

4. The information processing apparatus according to claim 1, wherein the processor further executing the program code to perform creating a new arithmetic expression by combining one or more operators including the new operator.

5. The information processing apparatus according to claim 1, wherein the contribution ratio is a ratio of the new operator as an arithmetic result of the new expression.

6. An information processing method of an information processing apparatus comprising a processor and a memory device, the method comprising the steps of:
- extracting, by the processor, a common operator permutation existing in a plurality of arithmetic expressions, the common operator permutation comprising a plurality of operators;
- registering, by the processor, in the memory device the extracted common operator permutation as a new operator after the extraction;
- creating, by the processor, a first new arithmetic expression including the new operator;
- calculating, by the processor, a contribution ratio of the new operator to the first new expression;
- comparing, by the processor, the contribution ratio with a pre-determined value;
- re-using the new operator for a second new expression if the contribution ratio is higher than or equal to the pre-determined value; and
- modifying the new operator if the contribution ratio is lower than the pre-determined value.

7. The method according to claim 6, further comprising:
- creating, by the processor, a plurality of operator permutations, each of the created operator permutations including a specified number of operators, and
- identifying, by the processor, one of the created permutations, which has a high appearance frequency in the plurality of the arithmetic expressions, as the common operator permutation.

8. The method according to claim 6, further comprising:
- creating, by the processor, a new arithmetic expression by combining one or more operators including the new operator.

9. A non-transitory computer-readable storage medium tangibly storing a program to create a new arithmetic expression including one or more operators, the program causing a computer to execute a process comprising the steps of:
- extracting, by the computer, a common operator permutation existing in a plurality of arithmetic expressions, the common operator permutation comprising a plurality of operators;
- registering, by the computer, the extracted common operator permutation as a new operator after the extraction;
- creating, by the computer, a first new arithmetic expression including the new operator;
- calculating, by the computer, a contribution ratio of the new operator to the first new expression;
- comparing, by the computer, the contribution ratio with a pre-determined value; and re-using the new operator for a second new expression if the contribution ratio is higher than or equal to the pre-determined value; and modifying the new operator if the contribution ratio is lower than the pre-determined value.

* * * * *